United States Patent
Liu et al.

(10) Patent No.: US 11,259,278 B2
(45) Date of Patent: Feb. 22, 2022

(54) METHOD FOR SELECTING A PLURALITY OF CARRIERS AND RELATED DEVICE

(71) Applicant: Huawei Technologies Co., Ltd., Shenzhen (CN)

(72) Inventors: Hang Liu, Beijing (CN); Mingchao Li, Beijing (CN); Zhenwei Lu, Beijing (CN); Zhenzhen Cao, Beijing (CN); Xiao Xiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 16/874,992

(22) Filed: May 15, 2020

(65) Prior Publication Data

US 2020/0280960 A1    Sep. 3, 2020

Related U.S. Application Data

(63) Continuation of application No. PCT/CN2017/111466, filed on Nov. 16, 2017.

(51) Int. Cl.
| | | |
|---|---|---|
| *H04W 72/02* | (2009.01) | |
| *H04W 28/02* | (2009.01) | |
| *H04W 72/04* | (2009.01) | |
| *H04W 48/10* | (2009.01) | |

(52) U.S. Cl.
CPC ....... *H04W 72/02* (2013.01); *H04W 28/0252* (2013.01); *H04W 48/10* (2013.01); *H04W 72/048* (2013.01)

(58) Field of Classification Search
None
See application file for complete search history.

(56) References Cited

U.S. PATENT DOCUMENTS 8,654,717 B2 * 2/2014 Ishii .................... H04L 5/0007
                                                      370/329
2020/0296692 A1 * 9/2020 Lee .................... H04W 52/383

FOREIGN PATENT DOCUMENTS

| CN | 105392210 A | 3/2016 |
|---|---|---|
| CN | 106063345 A | 10/2016 |
| EP | 3131352 A1 | 2/2017 |
| WO | 2017111316 A1 | 6/2017 |

OTHER PUBLICATIONS

Ericsson, "Sidelink Carrier Selection Criteria", 3GPP TSG-RAN WG2 #99bis, Tdoc R2-1711493, Prague, Czech Republic, Oct. 9-13, 2017, 6 pages.

(Continued)

*Primary Examiner* — Hong S Cho
(74) *Attorney, Agent, or Firm* — Slater Matsil, LLP

(57) ABSTRACT

This application discloses a method for selecting a plurality of carriers and a related device. The method includes: obtaining, by a first terminal, first configuration information, where the first configuration information includes at least one piece of first carrier information and corresponding first channel congestion parameter information; obtaining first data; selecting at least one direct link transmission carrier for the first data according to the first carrier information and in a priority sequence based on the first channel congestion parameter information; and sending the first data on the direct link transmission carrier.

20 Claims, 8 Drawing Sheets

(56) References Cited

OTHER PUBLICATIONS

Huawei et al., "New WID on 3GPP V2X Phase 2," 3GPP TSG RAN Meeting #75, RP-170798, Dubrovnik, Croatia, Mar. 6-9, 2017, 5 pages.
3rd Generation Partnership Project;Technical Specification Group Core Network and Terminals; User Equipment (UE) to V2X control function; protocol aspects; Stage 3 (Release 14), 3GPP TS 24.386 V14.2.0 (Sep. 2017), 34 pages.
3rd Generation Partnership Project; Technical Specification Group Radio Access Network; Evolved Universal Terrestrial Radio Access (E-UTRA); Physical layer; Measurements (Release 13), 3GPP TS 36.214 V13.5.0 (Sep. 2017), 21 pages.
3rd Generation Partnership Project; Technical Specification Group Radio Access Network; Evolved Universal Terrestrial Radio Access (E-UTRA); Medium Access Control (MAC) protocol specification (Release 14), 3GPP TS 36.321 V14.4.0 (Sep. 2017), 108 pages.
3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.15.1 (Sep. 2017), 460 pages.
Catt, "Carrier configuration and carrier selection in eV2X CA," 3GPP TSG-RAN WG2 #99, R2-1708052, Berlin, Germany, Aug. 21-25, 2017, 4 pages.
Huawei (Rapporteur), "Summary of [99#48][eV2x] Selection of Tx carriers," 3GPP TSG-RAN WG2 Meeting #99bis, R2-1710089, Prague, Czech Republic, Oct. 9-13, 2017, 26 pages.
Oppo, "Mode 4 support in eV2X carrier aggregation", 3GPP TSG RAN WG1 Meeting #90bis, R1-1718036, Prague, CZ, Oct. 9-13, 2017, 4 pages.

\* cited by examiner

| First carrier \ Parameter | First channel congestion threshold | Channel congestion value |
|---|---|---|
| F4 | 50% | 30% |
| F5 | 60% | 61% |
| F6 | 40% | 35% |

METHOD FOR SELECTING A PLURALITY OF CARRIERS AND RELATED DEVICE

CROSS-REFERENCE TO RELATED APPLICATIONS

This application is a continuation of International Patent Application No. PCT/CN2017/111466, filed on Nov. 16, 2017, the disclosure of which is hereby incorporated by reference in its entirety.

TECHNICAL FIELD

This application relates to the communications field, and in particular, to a method for selecting a plurality of carriers and a related device.

BACKGROUND

A large quantity of traffic accidents occur every year in the world, causing a large quantity of casualties and property losses. A main reason for the traffic accident is a lack of reliable information interaction between vehicles. Through vehicle-to-vehicle (V2V) communication, vehicle-to-infrastructure/network (V2I/N) communication, and vehicle-to-pedestrian (V2P) communication, an Internet of Vehicles system aims to improve road security, improve traffic efficiency, and provide rich streaming media services for a user.

An intelligent transportation system (ITS) has a strict requirement for a low latency and high reliability in communication. A $3^{rd}$ Generation Partner Project (3GPP) cellular technology has advantages such as a short delay, a fast speed, a wide coverage, a large capacity, and high reliability, and therefore using the cellular technology to implement the Internet of Vehicles becomes a current main trend.

In the prior art, V2X (V2V, V2I/N, or V2P) communication may be implemented through direct link communication. To be specific, during communication between vehicles, data does not need to be forwarded by a base station, and a resource for communication between the vehicles is configured by the base station or is preconfigured. A link for implementing direct communication between vehicles is referred to as a direct link, and is also referred to as a sidelink (SL). When a terminal device is in coverage of a network, a resource for direct link communication is configured by the base station; or when a terminal device is outside coverage of a network, a resource for direct link communication is a preconfigured resource. When the terminal device is in the coverage of the network, terminals communicate with each other through a direct link, and a resource for communication between the terminals is configured by the base station. Alternatively, when the terminal device is outside the coverage of the network, terminals communicate with each other through a direct link, and a resource for communication between the terminals is preconfigured.

Different from conventional point-to-point communication, information in a direct link is transmitted through one-to-many communication, and different receive ends in a system have different receiving capabilities. As a result, there is a contradiction between system performance and a capability of a receive end. If there are a plurality of carriers at a transmit end, to improve system performance, a terminal selects a carrier whose channel congestion value (Channel Busy Ratio, CBR) is relatively small to transmit a resource, and consequently the transmit end selects relatively divergent carriers. However, a receive end has a limited quantity of receive chains, and can receive data on only a limited quantity of carriers at the same time. If the transmit end selects relatively divergent carriers, the receive end cannot receive all data.

For example, it is assumed that a terminal (UE) 1 chooses to perform transmission on a carrier 3 (F3) and a carrier 4 (F4), and a terminal 3 (UE 3) chooses to perform transmission on a carrier 1 (F1) and a carrier 2 (F2). In this case, because the terminal 2 (UE 2) has only two receive chains, the terminal 2 (UE 2) can receive data of only one of the terminal 1 (UE 1) and the terminal 3 (UE 3) at a moment, as shown in FIG. 1; or the terminal 2 (UE 2) can receive only some data of the terminal 1 (UE 1) and the terminal 3 (UE 3) at a moment, as shown in FIG. 2.

SUMMARY

Embodiments of this application provide a method for selecting a plurality of carriers and a related device. When selecting a plurality of carriers, a transmit end may select the carriers in a sequence, so that the carriers selected by the transmit end converge as much as possible, and a receive end receives as much data sent by the transmit end as possible.

According to a first aspect, an embodiment of this application provides a method for selecting a plurality of carriers, including: obtaining, by a first terminal, first configuration information, where the first configuration information includes at least one piece of first carrier information and corresponding first channel congestion parameter information; obtaining, by the first terminal, first data; selecting, by the first terminal, at least one direct link transmission carrier for the first data according to the first carrier information and in a priority sequence based on the first channel congestion parameter information; and sending, by the first terminal, the first data on the direct link transmission carrier.

Through implementation of this embodiment of this application, when selecting a plurality of carriers, the first terminal may select the carriers in a sequence, so that the transmission carriers selected by the first terminal converge as much as possible, and a second terminal receives as much data sent by the first terminal as possible, thereby improving quality of communication in a direct link, and improving user experience.

With reference to the first aspect, in a first implementation of the first aspect, the method further includes: obtaining, by the first terminal, at least one piece of priority sequence information corresponding to the at least one piece of first carrier information; and the selecting, by the first terminal, at least one direct link transmission carrier for the first data according to the first carrier information and in a priority sequence based on the first channel congestion parameter information includes: selecting, by the first terminal, at least one direct link transmission carrier for the first data based on the first carrier information, the first channel congestion parameter information, and the priority sequence information.

This embodiment of this application provides a plurality of manners in which the first terminal obtains the priority sequence information of each first carrier. The first terminal may select a transmission carrier for the first data based on the priority sequence information of each first carrier. Therefore, when selecting a plurality of carriers, the first terminal selects the carriers in a sequence, so that the transmission carriers selected by the first terminal converge as much as possible, and the second terminal receives as much data sent by the first terminal as possible.

With reference to the first aspect or the first implementation of the first aspect, in a second implementation of the first aspect, the method further includes: obtaining, by the first terminal, first identification information corresponding to the first carrier information and/or the first channel congestion parameter information; and the selecting, by the first terminal, at least one direct link transmission carrier for the first data according to the first carrier information and in a priority sequence based on the first channel congestion parameter information includes: selecting, by the first terminal, at least one direct link transmission carrier for the first data according to the first identification information, the first carrier information and in the priority sequence based on the first channel congestion parameter information, where the first identification information includes at least one of the following: a data service priority, a data destination address, and a data service type.

Through implementation of this embodiment of this application, first carrier(s) matching the first data may be preliminarily selected by using the first identification information of a first carrier, and a direct link transmission carrier is further selected from the selected first carrier according to the first carrier information and in a priority sequence based on the first channel congestion parameter information, so that transmission carriers selected by the first terminal converge as much as possible, and the second terminal receives as much data sent by the first terminal as possible.

With reference to the first aspect or the first or the second implementation of the first aspect, in a third implementation of the first aspect, the first channel congestion parameter information includes a first channel congestion threshold or a first channel congestion range; and when the first channel congestion parameter information includes the first channel congestion threshold, the selecting, by the first terminal, at least one direct link transmission carrier for the first data according to the first carrier information and in a priority sequence based on the first channel congestion parameter information includes: selecting at least one direct link transmission carrier for the first data in the priority sequence from at least one second carrier in a first carrier corresponding to the at least one piece of first carrier information, where a channel congestion value corresponding to the second carrier is less than or equal to the first channel congestion threshold; or when the first channel congestion parameter information includes the first channel congestion range, the selecting, by the first terminal, at least one direct link transmission carrier for the first data according to the first carrier information and in a priority sequence based on the first channel congestion parameter information includes: selecting at least one direct link transmission carrier for the first data in the priority sequence from at least one second carrier in a first carrier corresponding to the at least one piece of first carrier information, where a channel congestion value corresponding to the second carrier falls within the first channel congestion range.

In this embodiment of this application, second carrier(s) meeting a condition is first selected from the first carrier based on the first channel congestion parameter information, and then a transmission carrier is selected from the second carrier in a priority sequence, so as to ensure that a channel congestion value of the transmission carrier meets the condition, thereby ensuring communication quality.

With reference to the third implementation of the first aspect, in a fourth implementation of the first aspect, the selecting at least one direct link transmission carrier for the first data in the priority sequence from at least one second carrier in a first carrier corresponding to the at least one piece of first carrier information includes: selecting at least one carrier with a minimum channel congestion value from the second carrier as the direct link transmission carrier.

In this embodiment of this application, a priority sequence of carriers is determined based on channel congestion values, and transmission carriers are selected based on the channel congestion values, so that the transmission carriers are carriers with a smallest channel congestion value as much as possible, and the second terminal receives as much data sent by the first terminal as possible, thereby improving communication quality.

With reference to the third implementation of the first aspect, in a fifth implementation of the first aspect, the selecting at least one direct link transmission carrier for the first data in the priority sequence from at least one second carrier in a first carrier corresponding to the at least one piece of first carrier information includes: selecting at least one second carrier with a highest priority as the direct link transmission carrier.

In this embodiment of this application, transmission carriers are selected in a priority sequence of carriers, so that the transmission carriers are carriers with a lowest priority as much as possible, so that the second terminal receives as much data sent by the first terminal as possible, thereby improving communication quality.

With reference to the third or the fourth implementation of the first aspect, in a sixth implementation of the first aspect, the channel congestion value corresponding to the second carrier is obtained by the first terminal through measurement or by receiving dedicated radio resource control RRC signaling or a system broadcast block SIB message sent by a base station.

With reference to the third, the fourth, or the sixth implementation of the first aspect, in a seventh implementation of the first aspect, the channel congestion value corresponding to the second carrier is a channel congestion value of a first resource set corresponding to the second carrier.

With reference to the first aspect, in an eighth implementation of the first aspect, the selecting, by the first terminal, at least one direct link transmission carrier for the first data according to the first carrier information and in a priority sequence based on the first channel congestion parameter information includes: when the first terminal meets a first condition, selecting, by the first terminal, at least one direct link transmission carrier for the first data according to the first carrier information and in a priority sequence based on the first channel congestion parameter information, where the first condition includes at least one of the following: the first terminal selects or reselects a resource on a carrier corresponding to the at least one piece of first carrier information; or the first configuration information changes; or the first terminal receives dedicated RRC signaling sent by a base station; or the first terminal receives an SIB message sent by a base station; or a carrier on which the first data is allowed to be transmitted does not include a currently selected transmission carrier; or at least one third carrier exists in a carrier corresponding to the first carrier information, and a priority of the third carrier is higher than a priority of at least one of one or more currently selected transmission carriers; or at least one third carrier exists in a carrier corresponding to the first carrier information, and a channel congestion value corresponding to the third carrier is less than a channel congestion value corresponding to at least one of one or more currently selected transmission carriers; or at least one third carrier exists in a carrier corresponding to the first carrier information, a channel congestion value corresponding to the third carrier is less than a channel congestion value corresponding to at least one of one or more currently selected transmission carriers, and a difference between the channel congestion value corresponding to the third carrier and the channel congestion value corresponding to the at least one of the one or more currently selected transmission carriers is greater than or equal to a first threshold; or a channel congestion value corresponding to at least one of one or more transmission carriers currently selected by the first terminal is less than or equal to a second channel congestion threshold; or a channel congestion value corresponding to at least one of one or more transmission carriers currently selected by the first terminal falls within a second channel congestion range; or a channel congestion value corresponding to at least one of one or more transmission carriers currently selected by the first terminal is greater than or equal to a third channel congestion threshold; or a channel congestion value corresponding to at least one of one or more transmission carriers currently selected by the first terminal does not fall within a third channel congestion range; or a carrier selection timer or a carrier reselection timer is reset, where the channel congestion value corresponding to the at least one of the one or more currently selected transmission carriers is a channel congestion value of a second resource set corresponding to the currently selected transmission carrier; and the channel congestion value corresponding to the at least one of the one or more currently selected transmission carriers is obtained by the first terminal through measurement or by receiving dedicated RRC signaling or an SIB message sent by a base station.

This embodiment of this application provides a plurality of conditions for triggering carrier selection or carrier reselection. A carrier can be selected or reselected only when the first condition is met, so as to prevent the first terminal from randomly selecting or reselecting a carrier. Complexity of a receive end is considered while ensuring that transmission carriers selected by the first terminal converge as much as possible and the receive end receives as much data as possible, thereby further improving communication quality.

According to a second aspect, an embodiment of this application provides a method for selecting a plurality of carriers, including: sending first configuration information to a first terminal, where the first configuration information includes at least one piece of first carrier information and corresponding first channel congestion parameter information, so that the first terminal selects at least one direct link transmission carrier according to the first carrier information and in a priority sequence based on the first channel congestion parameter information, and sends first data on the direct link transmission carrier.

With reference to the second aspect, in a first implementation of the second aspect, the method further includes: sending, to the first terminal, at least one piece of priority sequence information corresponding to the at least one piece of first carrier information, so that the first terminal selects at least one direct link transmission carrier for the first data according to the first carrier information and in a priority sequence based on the first channel congestion parameter information, and sends the first data on the direct link transmission carrier.

With reference to the second aspect or the first implementation of the second aspect, in a second implementation of the second aspect, the method further includes: sending, to the first terminal, first identification information corresponding to the first carrier information and/or the first channel congestion parameter information, so that the first terminal selects at least one direct link transmission carrier for the first data according to the first identification information, the first carrier information and in the priority sequence based on the first channel congestion parameter information, and sends the first data on the direct link transmission carrier, where the first identification information includes at least one of the following: a data service priority, a data destination address, and a data service type; or the first identification information may be any combination of a data service priority, a data destination address, and a data service type. This is not limited in this application.

According to a third aspect, an embodiment of this application provides a first terminal, including: a first obtaining module, configured to obtain first configuration information, where the first configuration information includes at least one piece of first carrier information and corresponding first channel congestion parameter information; a second obtaining module, configured to obtain first data; a selection module, configured to select at least one direct link transmission carrier for the first data according to the first carrier information and in a priority sequence based on the first channel congestion parameter information; and a sending module, configured to send the first data on the direct link transmission carrier.

With reference to the third aspect, in a first implementation of the third aspect, the terminal further includes: a third obtaining module, configured to obtain at least one piece of priority sequence information corresponding to the at least one piece of first carrier information; and the selection module is configured to select at least one direct link transmission carrier for the first data based on the first carrier information, the first channel congestion parameter information, and the priority sequence information.

With reference to the third aspect or the first implementation of the third aspect, in a second implementation of the third aspect, the terminal further includes: a fourth obtaining module, configured to obtain first identification information corresponding to the first carrier information and/or the first channel congestion parameter information; and the selection module is configured to select at least one direct link transmission carrier for the first data according to the first identification information, the first carrier information and in the priority sequence based on the first channel congestion parameter information, where the first identification information includes at least one of the following: a data service priority, a data destination address, and a data service type.

With reference to the third aspect or the first or the second implementation of the third aspect, in a third implementation of the third aspect, the first channel congestion parameter information includes a first channel congestion threshold or a first channel congestion range; and when the first channel congestion parameter information includes the first channel congestion threshold, the selection module is configured to select at least one direct link transmission carrier for the first data in the priority sequence from at least one second carrier in a first carrier corresponding to the at least one piece of first carrier information, where a channel congestion value corresponding to the second carrier is less than or equal to the first channel congestion threshold; or when the first channel congestion parameter information includes the first channel congestion range, the selection module is configured to select at least one direct link transmission carrier for the first data in the priority sequence from at least one second carrier in a first carrier corresponding to the at least one piece of first carrier information, where a channel congestion value corresponding to the second carrier falls within the first channel congestion range.

With reference to the third implementation of the third aspect, in a fourth implementation of the third aspect, the selection module is configured to select at least one carrier with a minimum channel congestion value from the second carrier as the direct link transmission carrier.

With reference to the third implementation of the third aspect, in a fifth implementation of the third aspect, the selection module is configured to select at least one second carrier with a highest priority as the direct link transmission carrier.

With reference to the third or the fourth implementation of the third aspect, in a sixth implementation of the third aspect, the channel congestion value corresponding to the second carrier is obtained by the first terminal through measurement or by receiving dedicated radio resource control RRC signaling or a system broadcast block SIB message sent by a base station.

With reference to the third, the fourth, or the sixth implementation of the third aspect, in a seventh implementation of the third aspect, the channel congestion value corresponding to the second carrier is a channel congestion value of a first resource set corresponding to the second carrier.

With reference to the third aspect, in an eighth implementation of the third aspect, the selection module is configured to: when the first terminal meets a first condition, select, by the first terminal, at least one direct link transmission carrier for the first data according to the first carrier information and in the priority sequence based on the first channel congestion parameter information, where the first condition includes at least one of the following: the first terminal selects or reselects a resource on a carrier corresponding to the at least one piece of first carrier information; or the first configuration information changes; or the first terminal receives dedicated RRC signaling sent by a base station; or the first terminal receives an SIB message sent by a base station; or carrier(s) on which the first data is allowed to be transmitted does not include a currently selected transmission carrier; or at least one third carrier exists in a carrier corresponding to the first carrier information, and a priority of the third carrier is higher than a priority of at least one of one or more currently selected transmission carriers; or at least one third carrier exists in a carrier corresponding to the first carrier information, and a channel congestion value corresponding to the third carrier is less than a channel congestion value corresponding to at least one of one or more currently selected transmission carriers; or at least one third carrier exists in a carrier corresponding to the first carrier information, a channel congestion value corresponding to the third carrier is less than a channel congestion value corresponding to at least one of one or more currently selected transmission carriers, and a difference between the channel congestion value corresponding to the third carrier and the channel congestion value corresponding to the at least one of the one or more currently selected transmission carriers is greater than or equal to a first threshold; or a channel congestion value corresponding to at least one of one or more transmission carriers currently selected by the first terminal is less than or equal to a second channel congestion threshold; or a channel congestion value corresponding to at least one of one or more transmission carriers currently selected by the first terminal falls within a second channel congestion range; or a channel congestion value corresponding to at least one of one or more transmission carriers currently selected by the first terminal is greater than or equal to a third channel congestion threshold; or a channel congestion value corresponding to at least one of one or more transmission carriers currently selected by the first terminal does not fall within a third channel congestion range; or a carrier selection timer or a carrier reselection timer is reset, where the channel congestion value corresponding to the at least one of the one or more currently selected transmission carriers is a channel congestion value of a second resource set corresponding to the currently selected transmission carrier; and the channel congestion value corresponding to the at least one of the one or more currently selected transmission carriers is obtained by the first terminal through measurement or by receiving dedicated RRC signaling or an SIB message sent by a base station.

It should be noted that the foregoing plurality of first conditions may be arbitrarily combined.

According to a fourth aspect, an embodiment of this application provides a network device, including a first sending module, configured to send first configuration information to a first terminal, where the first configuration information includes at least one piece of first carrier information and corresponding first channel congestion parameter information, so that the first terminal selects at least one direct link transmission carrier according to the first carrier information and in a priority sequence based on the first channel congestion parameter information, and sends first data on the direct link transmission carrier.

With reference to the fourth aspect, in a first implementation of the fourth aspect, the network device further includes a second sending module, configured to send, to the first terminal, at least one piece of priority sequence information corresponding to the at least one piece of first carrier information, so that the first terminal selects at least one direct link transmission carrier for the first data according to the first carrier information and in the priority sequence based on the first channel congestion parameter information, and sends the first data on the direct link transmission carrier.

With reference to the fourth aspect or the first implementation of the fourth aspect, in a second implementation of the fourth aspect, the network device further includes: a third sending module, configured to send, to the first terminal, first identification information corresponding to the first carrier information and/or the first channel congestion parameter information, so that the first terminal selects at least one direct link transmission carrier for the first data according to the first identification information, the first carrier information and in the priority sequence based on the first channel congestion parameter information, and sends the first data on the direct link transmission carrier, where the first identification information includes at least one of the following: a data service priority, a data destination address, and a data service type.

According to a fifth aspect, an embodiment of this application provides a first terminal, including: a memory, configured to store a program instruction; and a processor, configured to invoke the program instruction stored in the memory, to perform the following operations: obtaining first configuration information, where the first configuration information includes at least one piece of first carrier information and corresponding first channel congestion parameter information; obtaining first data; selecting at least one direct link transmission carrier for the first data according to the first carrier information and in a priority sequence based on the first channel congestion parameter information; and sending the first data on the direct link transmission carrier.

With reference to the fifth aspect, in a first implementation of the fifth aspect, the processor is further configured to obtain at least one piece of priority sequence information corresponding to the at least one piece of first carrier information; and the selecting, by the processor, at least one direct link transmission carrier for the first data according to the first carrier information and in a priority sequence based on the first channel congestion parameter information includes: selecting at least one direct link transmission carrier for the first data based on the first carrier information, the first channel congestion parameter information, and the priority sequence information.

With reference to the fifth aspect or the first implementation of the fifth aspect, in a second implementation of the fifth aspect, the processor is further configured to obtain first identification information corresponding to the first carrier information and/or the first channel congestion parameter information; and the selecting, by the processor, at least one direct link transmission carrier for the first data according to the first carrier information and in a priority sequence based on the first channel congestion parameter information includes: selecting at least one direct link transmission carrier for the first data according to the first identification information, the first carrier information and in the priority sequence based on the first channel congestion parameter information, where the first identification information includes at least one of the following: a data service priority, a data destination address, and a data service type.

With reference to the fifth aspect or the first or the second implementation of the fifth aspect, in a third implementation of the fifth aspect, the first channel congestion parameter information includes a first channel congestion threshold or a first channel congestion range; and when the first channel congestion parameter information includes the first channel congestion threshold, the selecting, by the processor, at least one direct link transmission carrier for the first data according to the first carrier information and in a priority sequence based on the first channel congestion parameter information includes: selecting at least one direct link transmission carrier for the first data in the priority sequence from at least one second carrier in a first carrier corresponding to the at least one piece of first carrier information, where a channel congestion value corresponding to the second carrier is less than or equal to the first channel congestion threshold; or when the first channel congestion parameter information includes the first channel congestion range, the selecting, by the processor, at least one direct link transmission carrier for the first data according to the first carrier information and in a priority sequence based on the first channel congestion parameter information includes: selecting at least one direct link transmission carrier for the first data in the priority sequence from at least one second carrier in a first carrier corresponding to the at least one piece of first carrier information, where a channel congestion value corresponding to the second carrier falls within the first channel congestion range.

With reference to the third implementation of the fifth aspect, in a fourth implementation of the fifth aspect, the selecting, by the processor, at least one direct link transmission carrier for the first data in the priority sequence from at least one second carrier in a first carrier corresponding to the at least one piece of first carrier information includes: selecting at least one carrier with a minimum channel congestion value from the second carrier as the direct link transmission carrier.

With reference to the third implementation of the fifth aspect, in a fifth implementation of the fifth aspect, the selecting, by the processor, at least one direct link transmission carrier for the first data in the priority sequence from at least one second carrier in a first carrier corresponding to the at least one piece of first carrier information includes: selecting at least one second carrier with a highest priority as the direct link transmission carrier.

With reference to the third or the fourth implementation of the fifth aspect, in a sixth implementation of the fifth aspect, the channel congestion value corresponding to the second carrier is obtained by the processor through measurement or by receiving dedicated radio resource control RRC signaling or a system broadcast block SIB message sent by a base station.

With reference to the third, the fourth, or the sixth implementation of the fifth aspect, in a seventh implementation of the fifth aspect, the channel congestion value corresponding to the second carrier is a channel congestion value of a first resource set corresponding to the second carrier.

With reference to the fifth aspect, in an eighth implementation of the fifth aspect, the selecting, by the processor, at least one direct link transmission carrier for the first data according to the first carrier information and in a priority sequence based on the first channel congestion parameter information includes: when the first terminal meets a first condition, selecting, by the processor, at least one direct link transmission carrier for the first data according to the first carrier information and in the priority sequence based on the first channel congestion parameter information, where the first condition includes at least one of the following: the processor selects or reselects a resource on a carrier corresponding to the at least one piece of first carrier information; or the first configuration information changes; or the processor receives dedicated RRC signaling sent by a base station; or the processor receives an SIB message sent by a base station; or a carrier on which the first data is allowed to be transmitted does not include a currently selected transmission carrier; or at least one third carrier exists in a carrier corresponding to the first carrier information, and a priority of the third carrier is higher than a priority of at least one of one or more currently selected transmission carriers; or at least one third carrier exists in a carrier corresponding to the first carrier information, and a channel congestion value corresponding to the third carrier is less than a channel congestion value corresponding to at least one of one or more currently selected transmission carriers; or at least one third carrier exists in a carrier corresponding to the first carrier information, a channel congestion value corresponding to the third carrier is less than a channel congestion value corresponding to at least one of one or more currently selected transmission carriers, and a difference between the channel congestion value corresponding to the third carrier and the channel congestion value corresponding to the at least one of the one or more currently selected transmission carriers is greater than or equal to a first threshold; or a channel congestion value corresponding to at least one of one or more transmission carriers currently selected by the processor is less than or equal to a second channel congestion threshold; or a channel congestion value corresponding to at least one of one or more transmission carriers currently selected by the processor falls within a second channel congestion range; or a channel congestion value corresponding to at least one of one or more transmission carriers currently selected by the processor is greater than or equal to a third channel congestion threshold; or a channel congestion value corresponding to at least one of one or more transmission carriers currently selected by the processor does not fall within a third channel congestion range; or a carrier selection timer or a carrier reselection timer is reset, where the channel congestion value corresponding to the at least one of the one or more currently selected transmission carriers is a channel congestion value of a second resource set corresponding to the currently selected transmission carrier; and the channel congestion value corresponding to the at least one of the one or more currently selected transmission carriers is obtained by the processor through measurement or by receiving dedicated RRC signaling or an SIB message sent by a base station.

According to a sixth aspect, an embodiment of this application provides a network device, including: a memory, configured to store a program instruction; and a processor, configured to invoke the instruction stored in the memory, to perform the following operation: sending first configuration information to a first terminal, where the first configuration information includes at least one piece of first carrier information and corresponding first channel congestion parameter information, so that the first terminal selects at least one direct link transmission carrier according to the first carrier information and in a priority sequence based on the first channel congestion parameter information, and sends first data on the direct link transmission carrier.

With reference to the sixth aspect, in a first implementation of the sixth aspect, the memory is further configured to send, to the first terminal, at least one piece of priority sequence information corresponding to the at least one piece of first carrier information, so that the first terminal selects at least one direct link transmission carrier for the first data according to the first carrier information and in the priority sequence based on the first channel congestion parameter information, and sends the first data on the direct link transmission carrier.

With reference to the sixth aspect or the first implementation of the sixth aspect, in a second implementation of the sixth aspect, the memory is further configured to send, to the first terminal, first identification information corresponding to the first carrier information and/or the first channel congestion parameter information, so that the first terminal selects at least one direct link transmission carrier for the first data according to the first carrier information and in the priority sequence based on the first channel congestion parameter information, and sends the first data on the direct link transmission carrier, where the first identification information includes at least one of the following: a data service priority, a data destination address, and a data service type.

According to a seventh aspect, an embodiment of this application provides a computer readable storage medium, configured to store one or more computer programs, where the one or more computer programs include an instruction, and when the computer program runs on a computer, the instruction is used to perform the method for selecting a plurality of carriers provided in the first aspect or the second aspect.

According to an eighth aspect, an embodiment of this application provides a computer program, where the computer program includes an instruction, and when the computer program is executed on a computer, the instruction is used to perform the method for selecting a plurality of carriers provided in the first aspect or the second aspect.

It should be noted that any two or more of the first carrier, the second carrier, and the third carrier in this application may be the same or different, and this is not limited in this application. Likewise, any two or more of the first channel congestion threshold, the second channel congestion threshold, and the third channel congestion threshold in this application may be the same or different, and this is not limited in this application. Any two or more of the first channel congestion range, the second channel congestion range, and the third channel congestion range in this application may be the same or different, and this is not limited in this application.

Through implementation of the embodiments of this application, the first configuration information may be obtained, and at least one direct link transmission carrier is selected according to the first carrier information and in a priority sequence based on the first channel congestion parameter information, so that the first terminal sends the first data to at least one second terminal on the at least one direct link transmission carrier. When selecting a plurality of carriers, the first terminal selects the carriers in a sequence, so that the transmission carriers selected by the first terminal converge as much as possible, and the second terminal receives as much data sent by the first terminal as possible, thereby improving quality of communication in a direct link, and improving user experience.

BRIEF DESCRIPTION OF THE DRAWINGS

To describe the technical solutions in the embodiments of this application or in the prior art more clearly, the following briefly describes the accompanying drawings required for describing the embodiments or the prior art.

DETAILED DESCRIPTION OF ILLUSTRATIVE EMBODIMENTS

The following describes the technical solutions in embodiments of this application.

Figure 1:
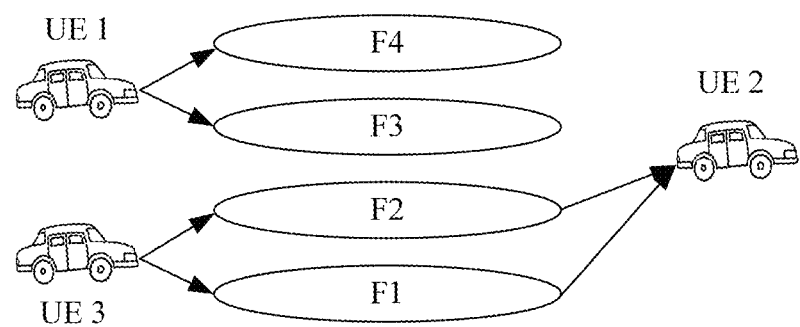
FIG. 1 and FIG. 2 are schematic diagrams of a contradiction between carrier selection at a transmit end and a receive chain limitation at a receive end.
Figure 2:
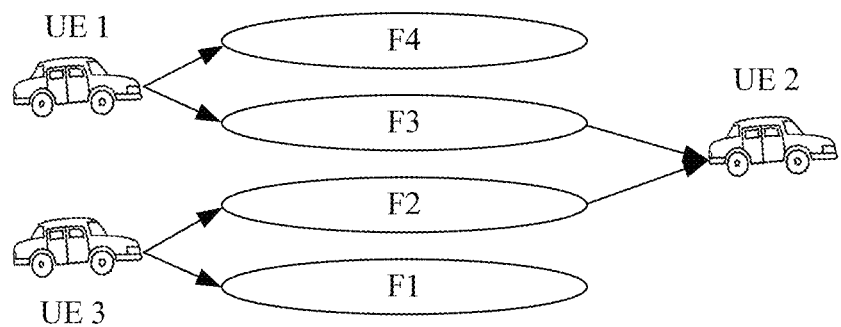
Figure 3:
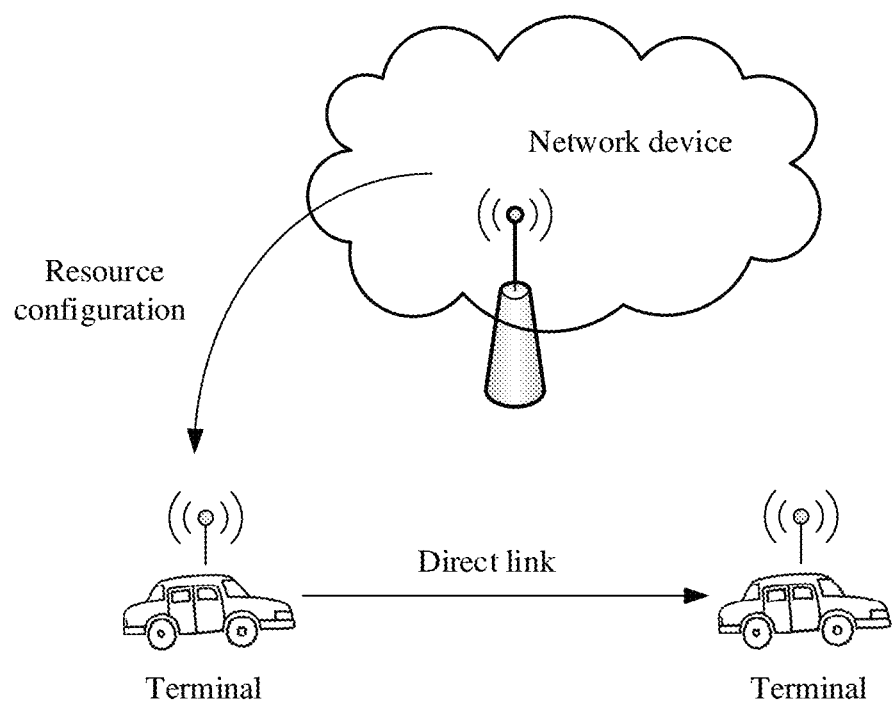
FIG. 3 is a schematic structural diagram of a communications system according to an embodiment of this application.

First, FIG. 3 is a schematic structural diagram of a communications system according to an embodiment of this application. As shown in FIG. 3, the communications system may include at least a first terminal and at least one second terminal, and the first terminal communicates with the at least one second terminal through a direct link. When the first terminal is in coverage of a network, the communications system may further include a network device. Before the first terminal sends data to the second terminal, the first terminal selects at least one carrier from resources configured for the network, and sends the data to the second terminal through a direct link. It may be learned that when the first terminal is outside the coverage of the network, the first terminal may select at least one carrier from a resource preconfigured by a network device for the first terminal, and send the data to the second terminal through a direct link.

It should be noted that a network device in the embodiments of this application may be a base station or an access point, or may be a device in communication with a wireless terminal through one or more sectors on an air interface in an access network. A base station is used as an example for description in the embodiments of this application. For example, the base station may be a base transceiver station (BTS) in a global system for mobile communications (GSM) or code division multiple access (CDMA); or may be a NodeB (NB) in wideband code division multiple access (WCDMA); or may be an evolved NodeB (Evolutional Node B, eNB or eNodeB) in long term evolution (LTE), a relay station or an access point, or a gNB in a future 5G network. This is not limited herein.

A first terminal and a second terminal in the embodiments of this application each may be a terminal device (for example, an in-vehicle terminal device or a terminal device carried by a user in a vehicle) on a vehicle in V2X, may be a terminal device on X (X may be a vehicle, infrastructure, a network, a pedestrian, or the like), or may be a vehicle terminal or X. The terminal device herein may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, a user device (User Device or User Equipment). This is not limited herein.

It should be noted that communication between the first terminal and the second terminal in the embodiments of this application is not limited to V2X communication, and may be a scenario of device-to-device (D2D) communication, machine-to-machine (M2M) communication, or the like through a direct link. V2X communication is used as an example for description in the embodiments of this application.

Figure 4:
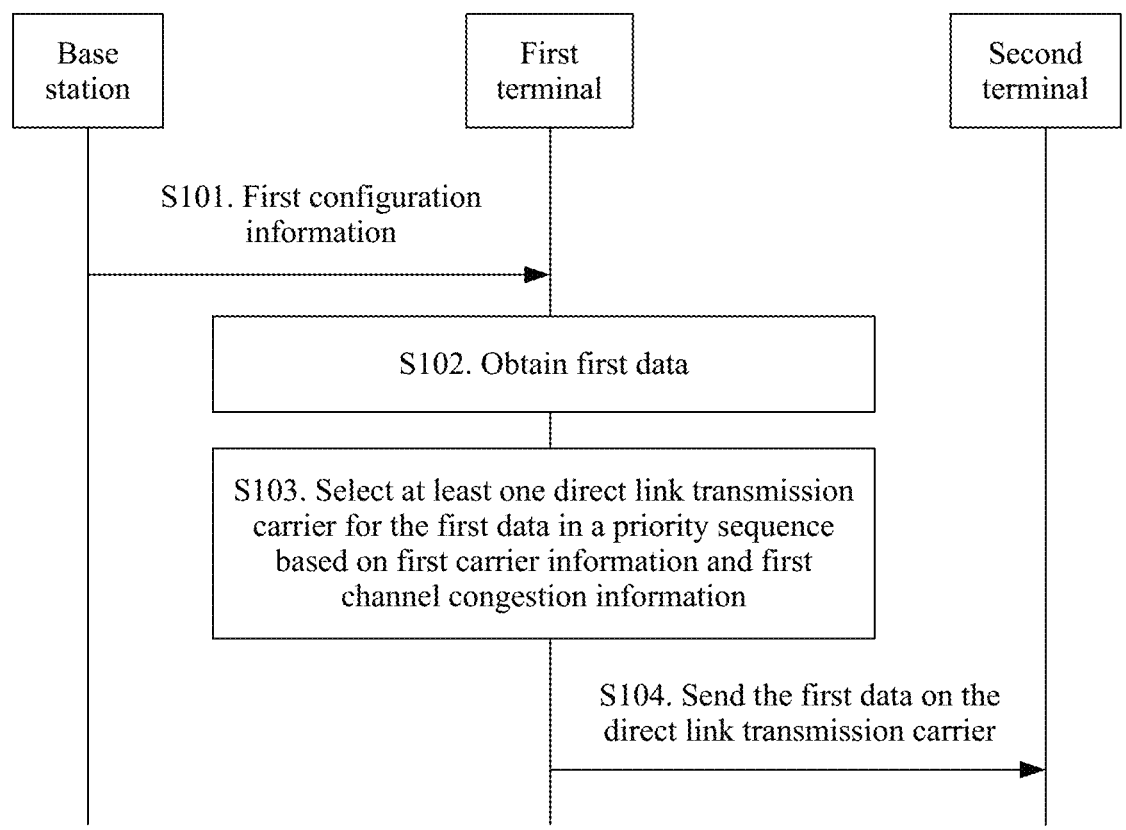
FIG. 4 is a flowchart of a method for selecting a plurality of carriers according to an embodiment of this application.

A method for selecting a plurality of carriers provided in an embodiment of this application is described below with reference to the communications system described in FIG. 3. As shown in FIG. 4, the method for selecting a plurality of carriers may include at least the following several steps.

S101. A base station sends first configuration information to a first terminal.

Specifically, the first configuration information may include at least one piece of first carrier information and corresponding first channel congestion parameter information. For example, the first carrier information may represent a first carrier identifier, but this is not limited thereto. For example, the first channel congestion parameter information may be corresponding to the first carrier information, and the first channel congestion parameter information represents channel congestion information of a first carrier. A channel congestion value (Channel Busy Ratio, CBR) is used to describe a busy degree of a resource set or a load degree of a resource set, for example, may be a ratio of a quantity of sub-channels whose power exceeds a threshold in a period of time in a resource set to all sub-channels in the resource set, or a ratio of a quantity of resource blocks whose power exceeds a threshold in a period of time in a resource set to all resource blocks in the resource set. It should be noted that each first carrier is corresponding to at least one resource set, and a channel congestion value of a resource set may represent a channel congestion value corresponding to a first carrier to which the resource set belongs.

Optionally, the first channel congestion parameter information may include a first channel congestion threshold.

Optionally, the first channel congestion parameter information may include a first channel congestion range.

Optionally, the first configuration information may be included in dedicated radio resource control (RRC) signaling or a system information block (SIB) message sent by the base station or included in preconfigured information. Specifically, the preconfigured information may be information preconfigured in a terminal at delivery of the terminal, or may be information that is configured by a network and that is stored in a terminal.

S102. The first terminal obtains first data.

Specifically, the first data is to-be-sent data, that is, data that the first terminal prepares to send to at least one second terminal. The first terminal may be understood as a transmit end, and the second terminal may be understood as a receive end.

It may be learned that an occurrence sequence of S101 and S102 is not limited herein.

S103. The first terminal selects at least one direct link transmission carrier for the first data according to the first carrier information and in a priority sequence based on first channel congestion parameter information.

Specifically, the priority sequence is a priority sequence of at least one first carrier corresponding to the at least one piece of first carrier information. The priority sequence herein may be a sorting sequence of the at least one first carrier, or may be a sequence for selecting the at least one first carrier when the first terminal selects a carrier. It may be learned that the priority sequence herein is not necessarily an actual priority sequence and may be a priority sequence existing in another form.

Specifically, the priority sequence may be a parameter preconfigured by the base station for the first terminal, and explicitly indicates the priority sequence of the at least one first carrier. The priority sequence may be a priority sequence that is of the at least one first carrier and that is determined by the first terminal based on actual CBR values of the at least one first carrier, that is, the priority sequence of the at least one first carrier is indirectly determined by using a channel congestion value corresponding to each first carrier. In a specific implementation, a first carrier with a smaller channel congestion value may have a higher priority, or a first carrier with a smaller channel congestion value may have a higher priority in first carrier(s) whose channel congestion value falls within a range.

In a possible embodiment, when the first channel congestion parameter information includes the first channel congestion threshold, the first terminal may select at least one second carrier based on the first channel congestion threshold corresponding to each first carrier, and then the first terminal selects at least one direct link transmission carrier for the first data in a priority sequence from the at least one second carrier. A channel congestion value corresponding to the second carrier is less than or equal to the first channel congestion threshold.

In a possible embodiment, when the first channel congestion parameter information includes the first channel congestion range, the first terminal may select at least one second carrier based on the first channel congestion threshold corresponding to each first carrier, and then the first terminal selects at least one direct link transmission carrier for the first data in a priority sequence from the at least one second carrier. A channel congestion value corresponding to the second carrier falls within the first channel congestion range.

In a possible embodiment, if the priority sequence of the at least one first carrier is a parameter preconfigured by the base station for the first terminal, the first terminal may select at least one second carrier with a highest priority from the second carrier as the direct link transmission carrier.

In a possible embodiment, if the priority sequence of the at least one first carrier is determined based on a channel congestion value corresponding to each first carrier, the first terminal may select at least one carrier with a minimum channel congestion value from the second carrier as the direct link transmission carrier.

S104. The first terminal sends the first data to a second terminal on the direct link transmission carrier.

Specifically, after selecting the direct link transmission carrier, the first terminal sends the first data to the at least one second terminal on the direct link transmission carrier, so as to implement data communication between the terminals.

It may be learned that the channel congestion value corresponding to the second carrier may be obtained by the first terminal through measurement, or may be obtained by the first terminal by receiving dedicated RRC signaling or an SIB message sent by the base station to the first terminal.

It may be learned that the channel congestion value corresponding to the second carrier is a channel congestion value of a first resource set corresponding to the second carrier. Each second carrier may include at least one first resource set. In a possible embodiment, the first resource set may be a resource pool, and the resource pool includes at least one time-frequency resource. In a possible embodiment, the first resource set corresponding to the second carrier is some or all time-frequency resources on the second carrier. Specifically, the first resource set may be consecutive or inconsecutive.

Through implementation of this embodiment of this application, the first configuration information may be obtained, and at least one direct link transmission carrier is selected according to the first carrier information and in a priority sequence based on the first channel congestion parameter information, so that the first terminal sends the first data to the at least one second terminal on the at least one direct link transmission carrier. When selecting a plurality of carriers, the first terminal selects the carriers in a sequence, so that the transmission carriers selected by the first terminal converge as much as possible, and the second terminal receives as much data sent by the first terminal as possible.

Figure 5:
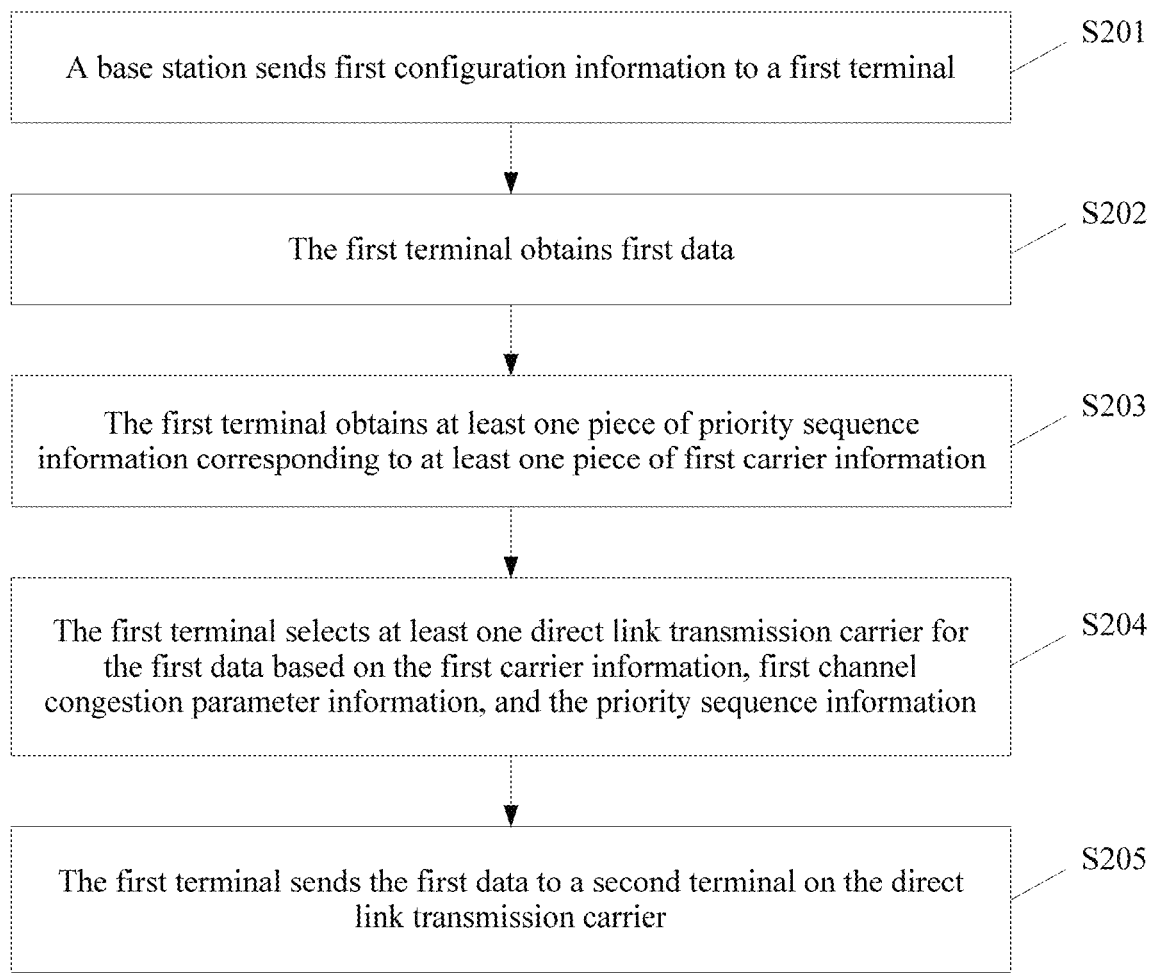
FIG. 5 is a flowchart of another method for selecting a plurality of carriers according to an embodiment of this application.

An embodiment of this application further provides another method for selecting a plurality of carriers. As shown in FIG. 5, the method for selecting a plurality of carriers may include at least the following several steps.

S201. A base station sends first configuration information to a first terminal.

Specifically, S201 is the same as S101, and details are not described herein again.

S202. The first terminal obtains first data.

Specifically, S202 is the same as S102, and details are not described herein again.

S203. The first terminal obtains at least one piece of priority sequence information corresponding to at least one piece of first carrier information.

Specifically, the priority sequence information may be obtained by the first terminal by receiving configuration information or preconfigured information sent by the base station to the first terminal. The configuration information or the preconfigured information may explicitly indicate a priority sequence of first carrier(s). The priority sequence information may be obtained by the first terminal based on a channel congestion value corresponding to each first carrier, to be specific, a priority sequence of the at least one first carrier is indirectly determined by using the channel congestion value corresponding to each first carrier. In a specific implementation, a first carrier with a smaller channel congestion value may have a higher priority, or a first carrier with a smaller channel congestion value may have a higher priority in first carrier(s) whose channel congestion value falls within a range.

In a possible embodiment, a priority sequence may be implicit. For example, a priority sequence of carriers may be represented by a sorting sequence of the carriers. For example, for {F1, F2, F3}, a priority of F1 is higher than a priority of F2, the priority of F2 is higher than a priority of F3; or there may be a reverse case, that is, a priority of F3 is higher than a priority of F2, and the priority of F2 is higher than a priority of F1.

In a possible embodiment, if there are several first carriers, the base station configures same carrier priority information for the several carriers. The first terminal may further determine priorities of the several carriers based on channel congestion values corresponding to the several carriers, and a carrier with a smaller channel congestion value has a higher priority; or the terminal may randomly select at least one carrier from several carriers with a same priority. For example, for {F1, F2, F3}, a priority configured by the base station for F1 is 1, and priorities configured by the base station for F2 and F3 are 2. When a channel congestion value of F3 is less than that of F2 in this case, if the terminal selects two carriers, the two carriers selected by the terminal are {F1, F3}; or if the terminal randomly selects a carrier from carriers with a same priority, a result may be {F1, F2} or {F1, F3}.

Specifically, an occurrence sequence of S203, S201, and S202 is not limited herein.

It should be noted that in a possible embodiment, the at least one piece of priority sequence information corresponding to the at least one piece of first carrier information may be included in the first configuration information, and therefore the terminal may receive the first configuration information to obtain the at least one piece of priority sequence information corresponding to the at least one piece of first carrier information. In this case, step S201 and step S203 may be combined. Certainly, it may be understood that the at least one piece of priority sequence information corresponding to the at least one piece of first carrier information may not be included in the first configuration information.

Optionally, the at least one piece of priority sequence information corresponding to the at least one piece of first carrier information may be included in dedicated RRC signaling or an SIB message sent by the base station or included in preconfigured information. Specifically, the preconfigured information may be information preconfigured in a terminal at delivery of the terminal, or may be information that is configured by a network and that is stored in a terminal.

S204. The first terminal selects at least one direct link transmission carrier for the first data based on the first carrier information, first channel congestion parameter information, and the priority sequence information.

Specifically, after determining the priority sequence information corresponding to each piece of first carrier information, the first terminal selects at least one direct link transmission carrier for the first data in a priority sequence, represented by the priority sequence information, of first carriers with reference to the first carrier information and the first channel congestion parameter information.

S205. The first terminal sends the first data to a second terminal on the direct link transmission carrier.

Specifically, S205 is the same as S104, and details are not described herein again.

This embodiment of this application provides a plurality of manners in which the first terminal obtains the priority sequence information of each first carrier. The first terminal may select a transmission carrier for the first data based on the priority sequence information of each first carrier. Therefore, when selecting a plurality of carriers, the first terminal selects the carriers in a sequence, so that the transmission carriers selected by the first terminal converge as much as possible, and the second terminal receives as much data sent by the first terminal as possible.

Figure 6:
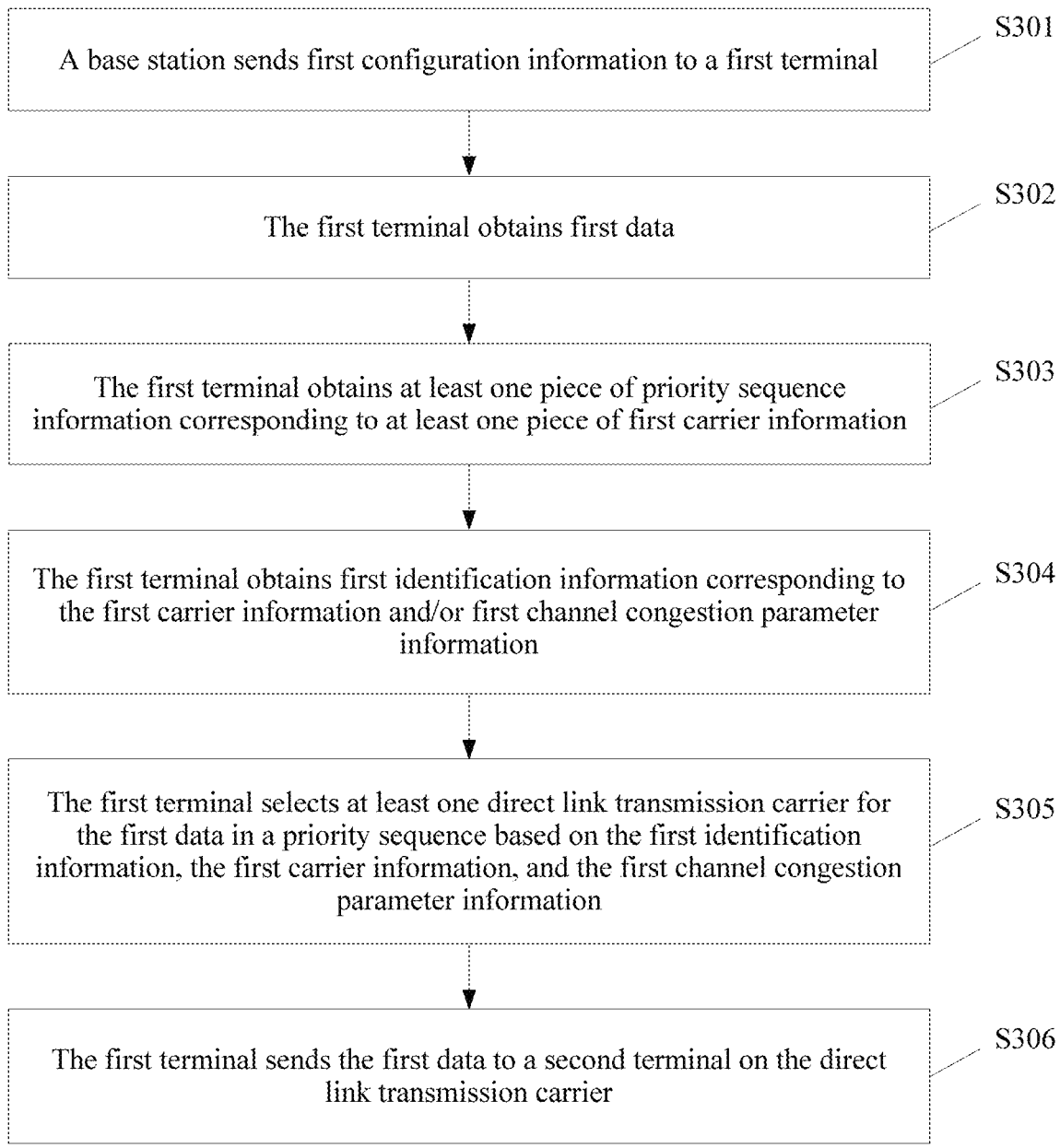
FIG. 6 is a flowchart of another method for selecting a plurality of carriers according to an embodiment of this application.

An embodiment of this application provides another method for selecting a plurality of carriers. As shown in FIG. 6, the method for selecting a plurality of carriers may include at least the following several steps.

S301. A base station sends first configuration information to a first terminal.

Specifically, S301 is the same as S201, and details are not described herein again.

S302. The first terminal obtains first data.

Specifically, S302 is the same as S202, and details are not described herein again.

S303. The first terminal obtains at least one piece of priority sequence information corresponding to at least one piece of first carrier information.

Specifically, S303 is the same as S203, and details are not described herein again.

S304. The first terminal obtains first identification information corresponding to the first carrier information and/or first channel congestion parameter information.

Specifically, the first identification information includes but is not limited to at least one of the following: a data service priority, a data destination address, and a data service type.

The first terminal may have a plurality of different types of services. The data service type may be services corresponding to different receive ends. For example, the foregoing different types of services may be a V2V service, a V2P service, a V2I service, and the like. Alternatively, data service types may be distinguished from each other by using an application layer identifier (for example, an ITS-AID (ITS Application Identifier), or a PSID (Provider Service Identifier)) carried at an application layer. For example, different application layer identifiers may represent different services. For example, an ITS-AID 1 may represent a collision warning service, and an ITS-AID 2 may represent a vehicle status exception alarm.

Data sent by the first terminal to a second terminal may have different service priorities. Different transmission parameters may be used at an access layer to treat data with different service priorities differently. For example, more resources may be configured for data with a relatively high priority at the access layer, or a relatively low modulation and coding scheme is allowed to be used for the data with a relatively high priority to ensure transmission reliability of the data.

Data sent by the first terminal to a second terminal may have different destination addresses. Different destination addresses may point to different second terminals. For example, the destination address may be a multicast address, a unicast address, or a broadcast address.

In a possible implementation form, there may be a mapping relationship between a data destination address and a data service type.

Optionally, a first carrier corresponding to the first carrier information may be determined based on the first carrier information, and the first identification information corresponding to the first carrier is further determined.

Optionally, a first carrier corresponding to the first channel congestion parameter information may be determined based on the first channel congestion parameter information, and the first identification information corresponding to the first carrier is further determined.

Optionally, a corresponding first carrier may be determined based on the first carrier information and the first channel congestion parameter information, and the first identification information corresponding to the first carrier is further determined.

Specifically, different first carriers may be corresponding to different first identification information, that is, different data service priorities, different data destination addresses, different data service types, and the like. After obtaining the first data, the first terminal may further determine second identification information of the first data based on the first data. The second identification information includes but is not limited to at least one of the following: a service type of the first data, a destination address of the first data, a service type of the first data, and the like. The first terminal may obtain, based on the second identification information of the first data, a plurality of first carriers that match the second identification information. The first identification information of the first carriers may include the second identification information of the first data. The second identification information and the first identification information may be the same or different. This is not limited in this application.

In a possible embodiment, that the first terminal determines the second identification information of the first data based on the first data may be as follows: The first terminal determines the second identification information of the first data based on the second identification information that is corresponding to the first data and that is obtained when the first terminal obtains the first data. For example, the second identification information may be transmitted by using a primitive.

S305. The first terminal selects at least one direct link transmission carrier for the first data according to the first identification information, the first carrier information and in a priority sequence based on the first channel congestion parameter information.

Specifically, the first terminal first selects, based on the first identification information, a plurality of first carriers that match the second identification information of the first data, and then selects at least one direct link transmission carrier for the first data according to the first carrier information and in the priority sequence based on the first channel congestion parameter information.

For a priority sequence of the plurality of first carriers, refer to descriptions of the priority sequence of the at least one first carrier in the foregoing embodiment. Details are not described herein again.

S306. The first terminal sends the first data to a second terminal on the direct link transmission carrier.

Specifically, S306 is the same as S205, and details are not described herein again.

Specifically, an occurrence sequence of S301, S302, S303, and S304 is not limited herein.

It should be noted that in a possible embodiment, the first identification information corresponding to the first channel congestion parameter information may be included in the first configuration information, and therefore the first terminal may receive the first configuration information to obtain the first identification information corresponding to the first channel congestion parameter information. In this case, step S301 and step S304 may be combined. Certainly, it may be understood that the first identification information corresponding to the first channel congestion parameter information may be included in the first configuration information or may not be included in the first configuration information.

It should be noted that in a possible embodiment, the first identification information corresponding to the first channel congestion parameter information and the at least one piece of priority sequence information corresponding to the at least one piece of first carrier information may be included in same information, for example, second configuration information. Therefore, the terminal may receive the second configuration information to obtain the first identification information corresponding to the first channel congestion parameter information and the at least one piece of priority sequence information corresponding to the at least one piece of first carrier information. In this case, step S303 and step S304 may be combined. Certainly, it may be understood that the first identification information corresponding to the first channel congestion parameter information and the at least one piece of priority sequence information corresponding to the at least one piece of first carrier information may not be included in same information.

Optionally, the first identification information corresponding to the first channel congestion parameter information may be included in dedicated RRC signaling or an SIB message sent by the base station or included in preconfigured information. Specifically, the preconfigured information may be information preconfigured in a terminal at delivery of the terminal, or may be information that is configured by a network and that is stored in a terminal.

Through implementation of this embodiment of this application, first carrier(s) matching the first data may be preliminarily selected by using the first identification information of a first carrier, and a direct link transmission carrier is further selected from the selected first carrier according to the first carrier information and in a priority sequence based on the first channel congestion parameter information, so that transmission carriers selected by the first terminal converge as much as possible, and the second terminal receives as much data sent by the first terminal as possible.

Figures 7, 8:
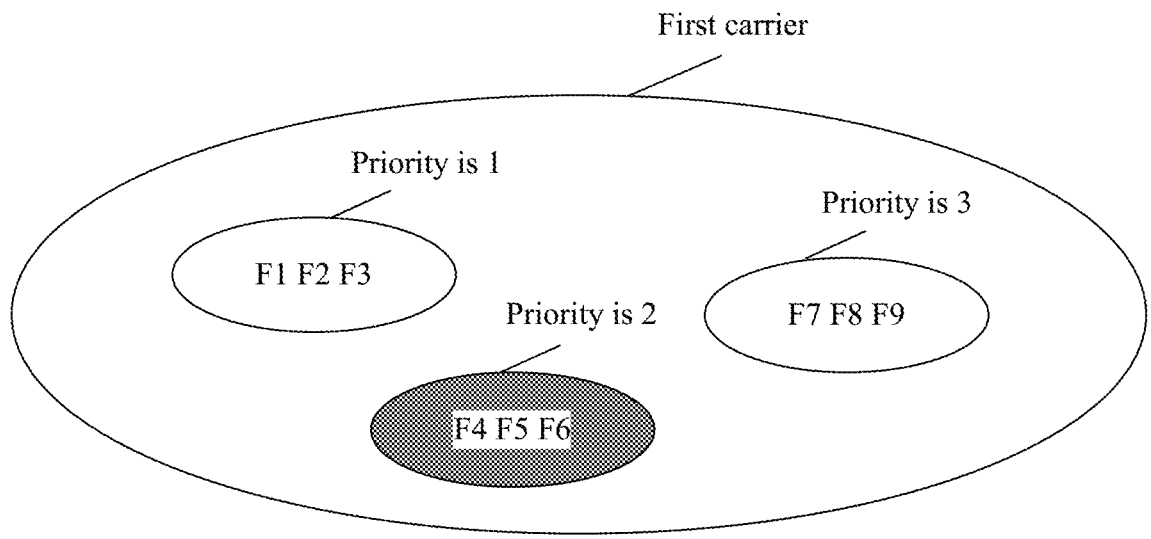
FIG. 7 is a schematic diagram of a specific scenario according to an embodiment of this application.
FIG. 8 is a schematic diagram of comparison between a first carrier and each of a first channel congestion threshold and a channel congestion value that are corresponding to the first carrier according to an embodiment of this application.

In a specific embodiment, it is assumed that first carriers configured by the base station for the first terminal include F1, F2, F3, F4, F5, F6, F7, F8, F9, and the like. As shown in FIG. 7, data service priorities corresponding to F1, F2, and F3 are 1, data service priorities corresponding to F4, F5, and F6 are 2, and data service priorities corresponding to F7, F8, and F9 are 3. If a service priority of the first data obtained by the first terminal is 2 in this case, first carriers that may be preliminarily selected by the first terminal include F4, F5, and F6. Further, the first terminal may select at least one direct link transmission carrier from F4, F5, and F6. A specific selection process is as follows:

It is assumed that the first channel congestion parameter information includes a first channel congestion threshold.

As shown in FIG. 8, a first channel congestion threshold corresponding to F4 is 50%, a channel congestion value corresponding to F4 is 30%; a first channel congestion threshold corresponding to F5 is 60%, a channel congestion value corresponding to F5 is 61%; and a first channel congestion threshold corresponding to F6 is 40%, and a channel congestion value corresponding to F6 is 35%.

A second carrier is then selected from the first carriers. Because the channel congestion value 61% corresponding to F5 is greater than the first channel congestion threshold 60% of F5, F5 is not the second carrier. Therefore, second carriers may include F6 and F4. If a priority sequence is determined based on a channel congestion value corresponding to each first carrier, a priority sequence of F6 and F4 in descending order is {F6, F4}. The first terminal may sequentially select a direct link transmission carrier from F6 and F4, and transmit the first data to the at least one second terminal on a finally selected direct link transmission carrier. If the first terminal needs to select one direct link transmission carrier to transmit the first data, the direct link transmission carrier is F6; or if the first terminal needs to select two direct link transmission carriers to transmit the first data, the direct link transmission carriers are F6 and F4.

In a possible embodiment, S103 in the foregoing embodiment can be performed only when the first terminal meets a first condition. To be specific, when the first terminal meets the first condition, the first terminal selects at least one direct link transmission carrier for the first data according to the first carrier information and in the priority sequence based on the first channel congestion parameter information Optionally, the first condition includes the following: The first terminal selects or reselects a resource on a carrier corresponding to the at least one piece of first carrier information. In a possible implementation, the carrier corresponding to the at least one piece of first carrier information may be at least one of one or more currently selected transmission carriers. In the R14 version of the V2X protocol defined by the $3^{rd}$ Generation Partnership Project, the first terminal may select a resource from a resource set corresponding to a current transmission carrier by using a monitoring reservation mechanism, and reserve resources for several subsequent transmissions each time the first terminal selects or reselects a resource. Therefore, when the first terminal selects or reselects a resource, it indicates that the first several transmissions end. In this case, the terminal may select or reselect a carrier. If the first terminal reselects a carrier in each transmission, overheads are extremely high.

Optionally, the first condition includes the following: The first configuration information changes.

Specifically, a carrier needs to be reselected if channel congestion parameter information of a currently used carrier changes, casing a channel congestion value of the carrier greater than a first channel congestion threshold corresponding to the carrier or does not fall within a first channel congestion range.

Optionally, the first condition includes the following: The first terminal receives dedicated RRC signaling sent by the base station.

For example, the dedicated RRC signaling sent by the base station to the first terminal may be resource reconfiguration signaling. In this case, the first carrier information and/or the first channel congestion parameter information that are/is included in the first configuration information may change, or other parameter information related to carrier selection may change. It may be understood that existence of the first configuration information may also be understood as that the first configuration information changes.

Optionally, the first condition includes the following: The first terminal receives an SIB message sent by the base station.

For example, the base station sends the SIB message to the first terminal, and the first carrier information and/or the first channel congestion parameter information that are/is included in the first configuration information in the SIB message may change, or other parameter information related to carrier selection may change. It may be understood that existence of the first configuration information may also be understood as that the first configuration information changes.

Optionally, the first condition includes the following: A carrier on which the first data is allowed to be transmitted does not include a currently selected transmission carrier.

For example, different data may need to be transmitted on different carriers according to spectrum regulation requirements of different regions. For first data newly obtained by the terminal, if a currently selected transmission carrier does not include a carrier on which the first data is allowed to be transmitted, the terminal needs to select at least one carrier for the first data from an allowed carrier range. It may be understood that the currently selected transmission carrier may be considered as an empty set during first transmission.

Optionally, the first condition includes the following: At least one third carrier exists in a carrier corresponding to the first carrier information, and a priority of the third carrier is higher than a priority of at least one of one or more currently selected transmission carriers.

For example, when at least one third carrier exists in a first carrier, and a priority of the third carrier is higher than a priority of at least one of one or more currently selected transmission carriers, that is, a resource reselection condition is met, the first terminal may select the third carrier with a higher priority as the direct link transmission carrier.

It may be learned that to avoid frequent carrier selection or carrier reselection, it may be set that the first terminal cannot randomly select or reselect a carrier in a period of time. Details may be as follows: In a period of time, if a channel congestion value of a currently selected carrier meets a condition, even if there is the third carrier with a higher priority, the first terminal does not need to select or reselect a carrier. Only after a period of time, the first terminal can select or reselect a carrier when there is the third carrier with a higher priority, and use the third carrier with a higher priority as the direct link transmission carrier.

Optionally, the first condition includes the following: At least one third carrier exists in a carrier corresponding to the first carrier information, and a channel congestion value corresponding to the third carrier is less than a channel congestion value corresponding to at least one of one or more currently selected transmission carriers.

For example, if a priority sequence is determined by a channel congestion value corresponding to each first carrier, when at least one third carrier exists in the first carriers, and a channel congestion value of the third carrier is less than a channel congestion value corresponding to at least one of one or more currently selected transmission carriers, that is, a carrier selection condition or a carrier reselection condition is met, the first terminal may select the third carrier with a higher priority as the direct link transmission carrier.

It may be learned that to avoid frequent carrier selection or carrier reselection, it may be set that the first terminal cannot randomly select or reselect a carrier in a period of time. For specific settings, refer to the foregoing related descriptions in the embodiment in which the third carrier with a higher priority is used as the transmission carrier. Details are not described herein again.

Further, the first condition includes the following: At least one third carrier exists in a carrier corresponding to the first carrier information, a channel congestion value corresponding to the third carrier is less than a channel congestion value corresponding to at least one of one or more currently selected transmission carriers, and a difference between the channel congestion value corresponding to the third carrier and the channel congestion value corresponding to the at least one of the one or more currently selected transmission carriers is greater than or equal to a first threshold.

It may be learned that to avoid frequent carrier selection or carrier reselection, when the channel congestion value corresponding to the third carrier is less than the channel congestion value corresponding to the at least one of the one or more currently selected transmission carriers, the difference between the channel congestion value corresponding to the third carrier and the channel congestion value corresponding to the at least one of the one or more currently selected transmission carriers further needs to be greater than or equal to the first threshold. For example, the difference between the channel congestion value corresponding to the third carrier and the channel congestion value corresponding to the at least one of the one or more currently selected transmission carriers may also be defined as an absolute value of a difference obtained by subtracting the channel congestion value corresponding to the at least one of the one or more currently selected transmission carriers from the channel congestion value corresponding to the third carrier. For example, the first threshold may be 0.1. To be specific, the difference between the channel congestion value corresponding to the at least one of the one or more currently selected transmission carriers and the channel congestion value corresponding to the third carrier needs to be greater than or equal to 0.1. The first threshold may be set to ensure that the channel congestion value corresponding to the third carrier to be reselected is greater than, to an extent, that of the currently selected transmission carrier to be replaced with the third carrier, thereby ensuring that communication quality is improved at a first degree.

Optionally, the first condition includes the following: A channel congestion value corresponding to at least one of one or more transmission carriers currently selected by the first terminal is less than or equal to a second channel congestion threshold.

For example, when the channel congestion value corresponding to the at least one of the one or more transmission carriers currently selected by the first terminal is less than or equal to the second channel congestion threshold, a carrier selection condition or a carrier reselection condition is met, and the first terminal may directly select at least one direct link transmission carrier from first carrier(s). In a feasible embodiment, the second channel congestion threshold may be an extremely small value. When the channel congestion value corresponding to the at least one of the one or more transmission carriers currently selected by the first terminal is less than or equal to the second channel congestion threshold, utilization of the transmission carrier is not high, and the base station may definitely schedule another carrier for the first terminal, so as to reduce a quantity of transmit chains or use the transmission carrier to perform another service. Another object of carrier selection or carrier reselection is not excluded in the present invention.

Optionally, the first condition includes the following: A channel congestion value corresponding to at least one of one or more transmission carriers currently selected by the first terminal falls within a second channel congestion range.

Specifically, when the channel congestion value corresponding to the at least one of the one or more transmission carriers currently selected by the first terminal falls within the second channel congestion range, a carrier selection condition or a carrier reselection condition is met, and at least one first terminal may directly select at least one direct link transmission carrier from a first carrier.

For example, the second channel congestion range may be a relatively large value. When the channel congestion value corresponding to the at least one of the one or more transmission carriers currently selected by the first terminal falls within the second channel congestion range, it indicates that a congestion degree of the currently selected transmission carrier is relatively large, and communication quality may be affected. Therefore, when the carrier selection condition or the carrier reselection condition is met, the first terminal may directly select at least one direct link transmission carrier from the first carrier.

Alternatively, for example, the second channel congestion range may be a relatively small value. When the channel congestion value corresponding to the at least one of the one or more transmission carriers currently selected by the first terminal falls within the second channel congestion range, it indicates that utilization of the transmission carrier is not high, and the base station may definitely schedule another carrier for the first terminal, so as to reduce a quantity of transmit chains or use the transmission carrier to perform another service. Therefore, when the carrier selection condition or the carrier reselection condition is met, the first terminal may directly select at least one direct link transmission carrier from the first carrier. Another object of carrier selection or carrier reselection is not excluded in the present invention.

Optionally, the first condition includes the following: A channel congestion value corresponding to at least one of one or more transmission carriers currently selected by the first terminal is greater than or equal to a third channel congestion threshold.

Specifically, when the channel congestion value corresponding to the at least one of the one or more transmission carriers currently selected by the first terminal is greater than or equal to the third channel congestion threshold, it indicates that a congestion degree of the currently selected transmission carrier is relatively large, and communication quality may be affected. Therefore, when a carrier selection condition or a carrier reselection condition is met, the first terminal may directly select at least one direct link transmission carrier from first carrier(s). It may be learned that the third channel congestion threshold may be greater than a first channel congestion threshold.

Optionally, the first condition includes the following: A channel congestion value corresponding to at least one of one or more transmission carriers currently selected by the first terminal does not fall within a third channel congestion range.

Specifically, when the channel congestion value corresponding to the at least one of the one or more transmission carriers currently selected by the first terminal does not fall within the third channel congestion range, a carrier selection condition or a carrier reselection condition is met, and the first terminal may directly select at least one direct link transmission carrier from first carrier(s). It may be learned that the third channel congestion range may include an entire first channel congestion range, that is, the first channel congestion range falls within the third channel congestion range.

Optionally, the first condition includes the following: A carrier selection timer or a carrier reselection timer is reset.

Specifically, to restrict frequent carrier selection or carrier reselection, a timer may be configured for the first terminal. When carrier selection or carrier reselection is initiated, the timer starts to decrease from a specified value T1. When the timer decreases to zero, carrier selection or carrier reselection is initiated.

Optionally, T1 may be included in dedicated RRC signaling or SIB message sent by the base station or included in preconfigured information. Specifically, the preconfigured information may be information preconfigured in a terminal at delivery of the terminal, or may be information that is configured by a network and that is stored in a terminal.

It may be learned that a channel congestion value corresponding to a currently selected transmission carrier includes a channel congestion value of a second resource set corresponding to the currently selected transmission carrier. In a possible embodiment, the second resource set may be a resource pool, and the resource pool includes at least one time-frequency resource. In a possible embodiment, a second resource set corresponding to at least one currently selected transmission carrier is some or all time-frequency resources on the at least one currently selected transmission carrier. Specifically, the second resource set may be consecutive or inconsecutive. The second resource set may be the same as or different from a first resource set.

It may be learned that a channel congestion value corresponding to a currently selected transmission carrier may be obtained by the first terminal through measurement, or may be obtained by the first terminal by receiving dedicated RRC signaling or an SIB message sent by the base station to the first terminal.

This embodiment of this application provides a plurality of conditions for triggering carrier selection and carrier reselection. The terminal can select or reselect a carrier only when the first condition is met, so as to present the terminal from randomly selecting or reselecting a carrier. Therefore, complexity of a receive end is considered while ensuring that transmission carriers selected by the terminal converge as much as possible and the receive end receives as much data as possible, thereby further improving communication quality.

The methods in the embodiments of this application are described in detail above. For ease of better implementing the foregoing solutions in the embodiments of this application, correspondingly, related apparatuses used to cooperate in implementing the foregoing solutions are further provided below.

Figure 9:
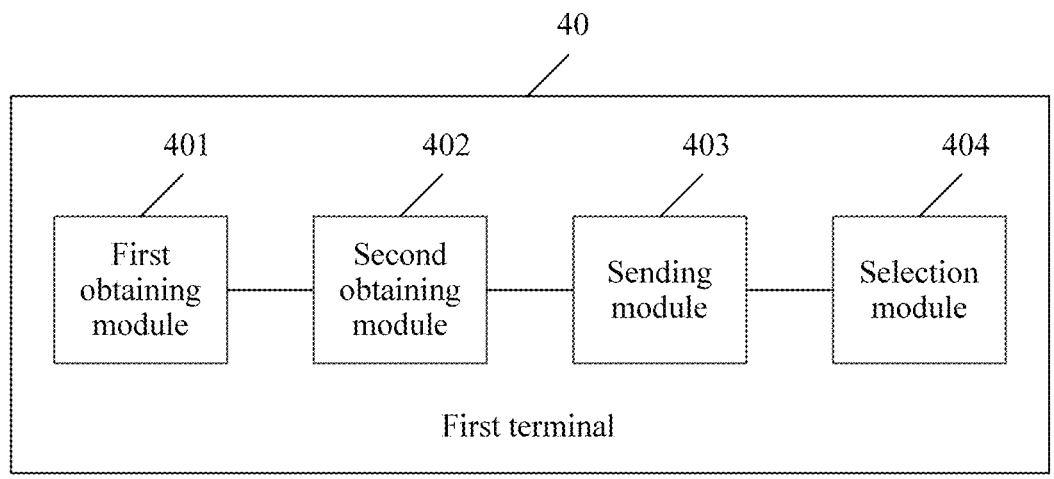
FIG. 9 is a schematic structural diagram of a first terminal according to an embodiment of this application.

For example, FIG. 9 is a schematic structural diagram of a first terminal according to an embodiment of this application. A first terminal 40 may include a first obtaining module 410, a second obtaining module 420, a selection module 430, and a sending module 440.

The first obtaining module 410 is configured to obtain first configuration information. The first configuration information includes at least one piece of first carrier information and corresponding first channel congestion parameter information.

The second obtaining module 420 is configured to obtain first data.

The selection module 430 is configured to select at least one direct link transmission carrier for the first data according to the first carrier information and in a priority sequence based on the first channel congestion parameter information.

The sending module 440 is configured to send the first data on the direct link transmission carrier.

Figure 10:
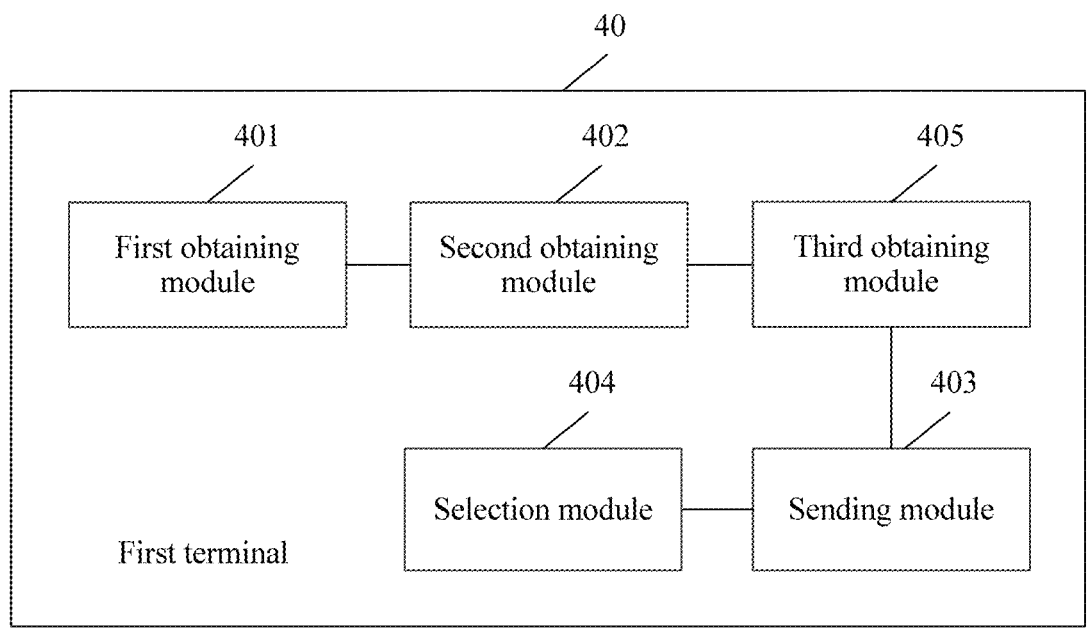
FIG. 10 is a schematic structural diagram of another first terminal according to an embodiment of this application.

In a possible embodiment, the first terminal 40 further includes a third obtaining module 450, as shown in FIG. 10.

The third obtaining module 450 is configured to obtain at least one piece of priority sequence information corresponding to the at least one piece of first carrier information.

The selection module 430 is configured to select at least one direct link transmission carrier for the first data based on the first carrier information, the first channel congestion parameter information, and the priority sequence information.

Figure 11:
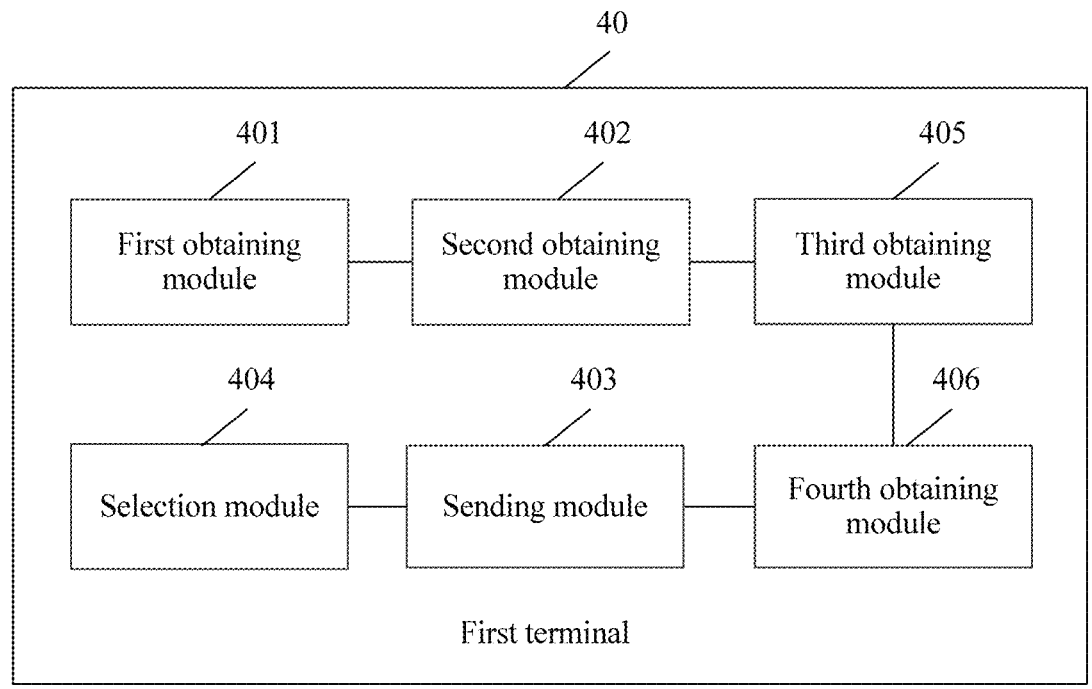
FIG. 11 is a schematic structural diagram of another first terminal according to an embodiment of this application.

In a possible embodiment, the first terminal 40 further includes a fourth obtaining module 460, as shown in FIG. 11.

The fourth obtaining module 460 is configured to obtain first identification information corresponding to the first carrier information and/or the first channel congestion parameter information.

The selection module 430 is configured to select at least one direct link transmission carrier for the first data according to the first identification information, the first carrier information and in the priority sequence based on the first channel congestion parameter information. The first identification information includes at least one of the following: a data service priority, a data destination address, and a data service type.

In a possible embodiment, the first channel congestion parameter information includes a first channel congestion threshold or a first channel congestion range.

When the first channel congestion parameter information includes the first channel congestion threshold, the selection module 430 is configured to select at least one direct link transmission carrier for the first data in the priority sequence from at least one second carrier in a first carrier corresponding to the at least one piece of first carrier information. A channel congestion value corresponding to the second carrier is less than or equal to the first channel congestion threshold.

Alternatively, when the first channel congestion parameter information includes the first channel congestion range, the selection module 430 is configured to select at least one direct link transmission carrier for the first data in the priority sequence from at least one second carrier in a first carrier corresponding to the at least one piece of first carrier information. A channel congestion value corresponding to the second carrier falls within the first channel congestion range.

In a possible embodiment, the selection module 430 is configured to select at least one carrier with a minimum channel congestion value from the second carrier as the direct link transmission carrier.

In a possible embodiment, the selection module 430 is configured to select at least one second carrier with a highest priority as the direct link transmission carrier.

In a possible embodiment, the channel congestion value corresponding to the second carrier is obtained by the first terminal 40 through measurement or by receiving dedicated radio resource control RRC signaling or a system broadcast block SIB message sent by a base station.

In a possible embodiment, the channel congestion value corresponding to the second carrier is a channel congestion value of a first resource set corresponding to the second carrier.

In a possible embodiment, the selection module 430 is configured to: when the first terminal 40 meets a first condition, select, by the first terminal 40, at least one direct link transmission carrier for the first data according to the first carrier information and in the priority sequence based on the first channel congestion parameter information.

The first condition includes at least one of the following: the first terminal 40 selects or reselects a resource on a carrier corresponding to the at least one piece of first carrier information; or the first configuration information changes; or the first terminal 40 receives dedicated RRC signaling sent by a base station; or the first terminal 40 receives an SIB message sent by a base station; or a carrier on which the first data is allowed to be transmitted does not include a currently selected transmission carrier; or at least one third carrier exists in a carrier corresponding to the first carrier information, and a priority of the third carrier is higher than a priority of at least one of one or more currently selected transmission carriers; or at least one third carrier exists in a carrier corresponding to the first carrier information, and a channel congestion value corresponding to the third carrier is less than a channel congestion value corresponding to at least one of one or more currently selected transmission carriers; or at least one third carrier exists in a carrier corresponding to the first carrier information, a channel congestion value corresponding to the third carrier is less than a channel congestion value corresponding to at least one of one or more currently selected transmission carriers, and a difference between the channel congestion value corresponding to the third carrier and the channel congestion value corresponding to the at least one of the one or more currently selected transmission carriers is greater than or equal to a first threshold; or a channel congestion value corresponding to at least one of one or more transmission carriers currently selected by the first terminal 40 is less than or equal to a second channel congestion threshold; or a channel congestion value corresponding to at least one of one or more transmission carriers currently selected by the first terminal 40 falls within a second channel congestion range; or a channel congestion value corresponding to at least one of one or more transmission carriers currently selected by the first terminal 40 is greater than or equal to a third channel congestion threshold; or a channel congestion value corresponding to at least one of one or more transmission carriers currently selected by the first terminal 40 does not fall within a third channel congestion range; or a carrier selection timer or a carrier reselection timer is reset.

The channel congestion value corresponding to the at least one of the one or more currently selected transmission carriers is a channel congestion value of a second resource set corresponding to the currently selected transmission carrier.

The channel congestion value corresponding to the at least one of the one or more currently selected transmission carriers is obtained by the first terminal 40 through measurement or by receiving dedicated RRC signaling or an SIB message sent by a base station.

It may be understood that a function of each function module of the first terminal 40 in this embodiment may be specifically implemented according to the method in the foregoing method embodiment, and details are not described herein again.

Through implementation of this embodiment of this application, the first configuration information may be obtained, and at least one direct link transmission carrier is selected according to the first carrier information and in a priority sequence based on the first channel congestion parameter information, so that the first terminal sends the first data to at least one second terminal on the at least one direct link transmission carrier. When selecting a plurality of carriers, the first terminal selects the carriers in a sequence, so that the transmission carriers selected by the first terminal converge as much as possible, and the second terminal receives as much data sent by the first terminal as possible.

An embodiment of this application further provides a network device, and the network device may include a first sending module, configured to send first configuration information to a first terminal. The first configuration information includes at least one piece of first carrier information and corresponding first channel congestion parameter information, so that the first terminal selects at least one direct link transmission carrier according to the first carrier information and in a priority sequence based on the first channel congestion parameter information, and sends first data on the direct link transmission carrier.

In a possible embodiment, the network device further includes a second sending module, configured to send, to the first terminal, at least one piece of priority sequence information corresponding to the at least one piece of first carrier information, so that the first terminal selects at least one direct link transmission carrier for the first data according to the first carrier information and in the priority sequence based on the first channel congestion parameter information, and sends the first data on the direct link transmission carrier.

In a possible embodiment, the network device further includes a third sending module, configured to send, to the first terminal, first identification information corresponding to the first carrier information and/or the first channel congestion parameter information, so that the first terminal selects at least one direct link transmission carrier for the first data according to the first identification information, the first carrier information and in the priority sequence based on the first channel congestion parameter information, and sends the first data on the direct link transmission carrier. The first identification information includes at least one of the following: a data service priority, a data destination address, and a data service type.

Figure 12:
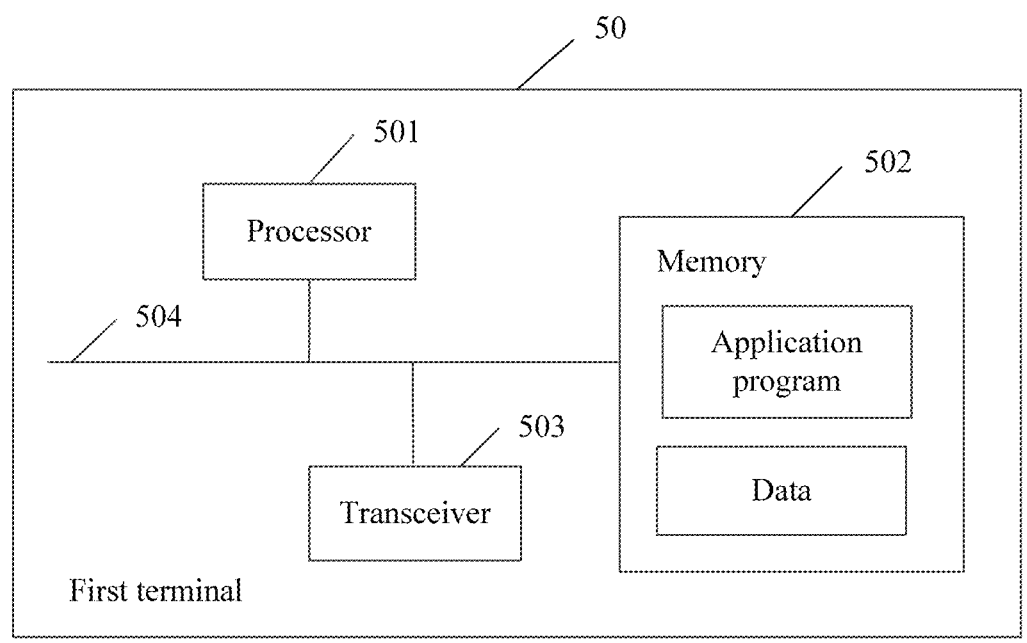
FIG. 12 is a schematic structural diagram of another first terminal according to an embodiment of this application.

FIG. 12 is a schematic structural diagram of another first terminal according to an embodiment of this application. As shown in FIG. 12, a first terminal 50 may include at least a processor 501, a memory 502, and a transceiver 503. The processor 501, the memory 502, and the transceiver 503 are connected to each other by using a bus 504.

The memory 502 includes but is not limited to a random access memory (RAM), a read-only memory (ROM), an erasable programmable read-only memory (EPROM), or a flash memory. The memory 502 is configured to store a related instruction and data.

The transceiver 503 such as a radio frequency module may include a receiver and a transmitter. That the processor 501 receives or sends a message described below may be specifically understood as that the processor 501 receives or sends a message by using the transceiver.

The processor 501 may be one or more central processing units (CPU). When the processor 501 is one CPU, the CPU may be a single-core CPU, or may be a multi-core CPU.

The processor 501 of the terminal device 50 is configured to read program code stored in the memory 502, to perform the following operations: obtaining first configuration information, where the first configuration information includes at least one piece of first carrier information and corresponding first channel congestion parameter information; obtaining first data; selecting at least one direct link transmission carrier for the first data according to the first carrier information and in a priority sequence based on the first channel congestion parameter information; and sending the first data on the direct link transmission carrier.

In a possible embodiment, the processor 501 is further configured to obtain at least one piece of priority sequence information corresponding to the at least one piece of first carrier information.

The selecting, by the processor 501, at least one direct link transmission carrier for the first data according to the first carrier information and in a priority sequence based on the first channel congestion parameter information includes: selecting at least one direct link transmission carrier for the first data based on the first carrier information, the first channel congestion parameter information, and the priority sequence information.

In a possible embodiment, the processor 501 is further configured to obtain first identification information corresponding to the first carrier information and/or the first channel congestion parameter information.

The selecting, by the processor 501, at least one direct link transmission carrier for the first data according to the first carrier information and in a priority sequence based on the first channel congestion parameter information includes: selecting at least one direct link transmission carrier for the first data based on the first identification information, the first carrier information, and the first channel congestion parameter information. The first identification information includes at least one of the following: a data service priority, a data destination address, and a data service type.

In a possible embodiment, the first channel congestion parameter information includes a first channel congestion threshold or a first channel congestion range.

When the first channel congestion parameter information includes the first channel congestion threshold, the selecting, by the processor 501, at least one direct link transmission carrier for the first data according to the first carrier information and in a priority sequence based on the first channel congestion parameter information includes: selecting at least one direct link transmission carrier for the first data in the priority sequence from at least one second carrier in a first carrier corresponding to the at least one piece of first carrier information. A channel congestion value corresponding to the second carrier is less than or equal to the first channel congestion threshold.

Alternatively, when the first channel congestion parameter information includes the first channel congestion range, the selecting, by the processor 501, at least one direct link transmission carrier for the first data according to the first carrier information and in a priority sequence based on the first channel congestion parameter information includes: selecting at least one direct link transmission carrier for the first data in the priority sequence from at least one second carrier in a first carrier corresponding to the at least one piece of first carrier information. A channel congestion value corresponding to the second carrier falls within the first channel congestion range.

In a possible embodiment, the selecting, by the processor 501, at least one direct link transmission carrier for the first data in the priority sequence from at least one second carrier in a first carrier corresponding to the at least one piece of first carrier information includes: selecting at least one carrier with a minimum channel congestion value from the second carrier as the direct link transmission carrier.

In a possible embodiment, the selecting, by the processor 501, at least one direct link transmission carrier for the first data in the priority sequence from at least one second carrier in a first carrier corresponding to the at least one piece of first carrier information includes: selecting at least one second carrier with a highest priority as the direct link transmission carrier.

In a possible embodiment, the channel congestion value corresponding to the second carrier is obtained by the processor 501 through measurement or by receiving dedicated radio resource control RRC signaling or a system broadcast block SIB message sent by a base station.

In a possible embodiment, the channel congestion value corresponding to the second carrier is a channel congestion value of a first resource set corresponding to the second carrier.

In a possible embodiment, the selecting, by the processor 501, at least one direct link transmission carrier for the first data according to the first carrier information and in a priority sequence based on the first channel congestion parameter information includes: when the first terminal 50 meets a first condition, selecting, by the processor 501, at least one direct link transmission carrier for the first data according to the first carrier information and in the priority sequence based on the first channel congestion parameter information.

The first condition includes at least one of the following: the processor 501 selects or reselects a resource on a carrier corresponding to the at least one piece of first carrier information; or the first configuration information changes; or the processor 501 receives dedicated RRC signaling sent by a base station; or the processor 501 receives an SIB message sent by a base station; or a carrier on which the first data is allowed to be transmitted does not include a currently selected transmission carrier; or at least one third carrier exists in a carrier corresponding to the first carrier information, and a priority of the third carrier is higher than a priority of at least one of one or more currently selected transmission carriers; or at least one third carrier exists in a carrier corresponding to the first carrier information, and a channel congestion value corresponding to the third carrier is less than a channel congestion value corresponding to at least one of one or more currently selected transmission carriers; or at least one third carrier exists in a carrier corresponding to the first carrier information, a channel congestion value corresponding to the third carrier is less than a channel congestion value corresponding to at least one of one or more currently selected transmission carriers, and a difference between the channel congestion value corresponding to the third carrier and the channel congestion value corresponding to the at least one of the one or more currently selected transmission carriers is greater than or equal to a first threshold; or a channel congestion value corresponding to at least one of one or more transmission carriers currently selected by the processor 501 is less than or equal to a second channel congestion threshold; or a channel congestion value corresponding to at least one of one or more transmission carriers currently selected by the processor 501 falls within a second channel congestion range; or a channel congestion value corresponding to at least one of one or more transmission carriers currently selected by the processor 501 is greater than or equal to a third channel congestion threshold; or a channel congestion value corresponding to at least one of one or more transmission carriers currently selected by the processor 501 does not fall within a third channel congestion range; or a carrier selection timer or a carrier reselection timer is reset.

The channel congestion value corresponding to the at least one of the one or more currently selected transmission carriers is a channel congestion value of a second resource set corresponding to the currently selected transmission carrier.

The channel congestion value corresponding to the at least one of the one or more currently selected transmission carriers is obtained by the processor 501 through measurement or by receiving dedicated RRC signaling or an SIB message sent by a base station.

It should be noted that specific implementation of each operation may be further specifically implemented according to the method in the foregoing method embodiment, and details are not described herein again.

Through implementation of this embodiment of this application, the first configuration information may be obtained, and at least one direct link transmission carrier is selected according to the first carrier information and in a priority sequence based on the first channel congestion parameter information, so that the first terminal sends the first data to at least one second terminal on the at least one direct link transmission carrier. When selecting a plurality of carriers, the first terminal selects the carriers in a sequence, so that the transmission carriers selected by the first terminal converge as much as possible, and the second terminal receives as much data sent by the first terminal as possible.

An embodiment of this application further provides another network device. The network device may include at least a processor, a memory, and a transceiver. The processor, the memory, and the transceiver are connected to each other by using a bus.

The memory includes but is not limited to a random access memory (RAM), a read-only memory (ROM), an erasable programmable read-only memory (EPROM), or a flash memory. The memory is configured to store a related instruction and data.

The transceiver such as a radio frequency module may include a receiver and a transmitter. That the processor 501 receives or sends a message described below may be specifically understood as that the processor receives or sends a message by using the transceiver.

The processor may be one or more central processing units (CPU). When the processor is one CPU, the CPU may be a single-core CPU, or may be a multi-core CPU.

The processor of the network device is configured to read program code stored in the memory, to perform the following operation: sending first configuration information to a first terminal. The first configuration information includes at least one piece of first carrier information and corresponding first channel congestion parameter information, so that the first terminal selects at least one direct link transmission carrier according to the first carrier information and in a priority sequence based on the first channel congestion parameter information, and sends first data on the direct link transmission carrier.

In a possible embodiment, the memory is further configured to send, to the first terminal, at least one piece of priority sequence information corresponding to the at least one piece of first carrier information, so that the first terminal selects at least one direct link transmission carrier for the first data according to the first carrier information and in the priority sequence based on the first channel congestion parameter information, and sends the first data on the direct link transmission carrier.

In a possible embodiment, the memory is further configured to send, to the first terminal, first identification information corresponding to the first carrier information and/or the first channel congestion parameter information, so that the first terminal selects at least one direct link transmission carrier for the first data according to the first identification information, the first carrier information and in the priority sequence based on the first channel congestion parameter information, and sends the first data on the direct link transmission carrier. The first identification information includes at least one of the following: a data service priority, a data destination address, and a data service type.

Another embodiment of this application provides a computer readable storage medium. The computer readable storage medium stores a computer program, the computer program includes a program instruction, and when executing the program instruction, the processor implements the following operations: obtaining first configuration information, where the first configuration information includes at least one piece of first carrier information and corresponding first channel congestion parameter information; obtaining first data; selecting at least one direct link transmission carrier for the first data according to the first carrier information and in a priority sequence based on the first channel congestion parameter information; and sending the first data on the direct link transmission carrier.

The computer readable storage medium may be an internal storage unit of a random access device in the foregoing embodiment, for example, a hard disk or memory of the random access device. The computer readable storage medium may be an external storage device of the random access device, for example, a removable hard disk, a smart storage card (SMC), a secure digital (SD) card, a flash card, and the like that are configured on the terminal. Further, the computer readable storage medium may include both the internal storage unit and the external storage device of the random access device. The computer readable storage medium is configured to store the computer program and other programs and data required by the random access device. The computer readable storage medium may be further configured to temporarily store data that has been output or is to be output.

An embodiment of this application further provides a computer program. The computer program includes an instruction, and when the computer program is executed on a computer, the instruction is used to perform the following operations: obtaining first configuration information, where the first configuration information includes at least one piece of first carrier information and corresponding first channel congestion parameter information; obtaining first data; selecting at least one direct link transmission carrier for the first data according to the first carrier information and in a priority sequence based on the first channel congestion parameter information; and sending the first data on the direct link transmission carrier.

A person of ordinary skill in the art may understand that all or some of the procedures of the methods in the embodiments may be implemented by a computer program instructing related hardware. The program may be stored in a computer readable storage medium. When the program is executed, the procedures of the methods in the embodiments are performed. The foregoing storage medium includes: any medium that can store program code, such as a ROM, a random access memory RAM, a magnetic disk, or an optical disc.

Although this application is described herein with reference to the embodiments, the scope of the claims of this application should not be limited. In a process of implementing this application that claims protection, a person skilled in the art may understand and implement all or some of the procedures in the foregoing embodiments by viewing the accompanying drawings, disclosed content, and the accompanying claims. Equivalent modifications made in accordance with the claims of this application shall fall within the scope of the present invention. In the claims, "comprising" does not exclude another component or another step, and "a" or "one" does not exclude a case of "a plurality of". A single controller or another unit may implement several functions enumerated in the claims. Some measures are recorded in dependent claims that are different from each other, but this does not mean that these measures cannot be combined to produce a better effect.

What is claimed is:

1. A method, comprising:
obtaining, by a first terminal, first configuration information, wherein the first configuration information comprises at least one piece of first carrier information and first channel congestion parameter information that corresponds to the at least one piece of first carrier information;
obtaining, by the first terminal, first data;
selecting, by the first terminal, at least one direct link transmission carrier for the first data according to the at least one piece of first carrier information and according to a priority sequence based on the first channel congestion parameter information; and
sending, by the first terminal, the first data on the at least one direct link transmission carrier.

2. The method according to claim 1, wherein obtaining the first configuration information comprises:
obtaining the first configuration information from a base station.

3. The method according to claim 1, wherein the at least one piece of first carrier information represents at least one first carrier identifier.

4. The method according to claim 1, wherein the first channel congestion parameter information represents channel congestion information of at least one first carrier corresponding to the at least one piece of first carrier information.

5. The method according to claim 1, wherein the first configuration information is included in dedicated radio resource control (RRC) signaling or a system information block (SIB) message.

6. The method according to claim 1, wherein:
the first channel congestion parameter information comprises a first channel congestion threshold; and
selecting, by the first terminal, the at least one direct link transmission carrier for the first data according to the at least one piece of first carrier information and according to the priority sequence based on the first channel congestion parameter information comprises:
selecting at least one direct link transmission carrier for the first data from at least one second carrier in at least one first carrier corresponding to the at least one piece of first carrier information, wherein a channel congestion value corresponding to the at least one second carrier is less than or equal to the first channel congestion threshold.

7. The method according to claim 6, wherein:
a carrier with a smaller channel congestion value has a higher priority in the priority sequence; and
selecting the at least one direct link transmission carrier for the first data from the at least one second carrier in the at least one first carrier corresponding to the at least one piece of first carrier information comprises:
selecting at least one carrier with a minimum channel congestion value from the at least one second carrier as the at least one direct link transmission carrier.

8. The method according to claim 6, further comprising:
obtaining, by the first terminal, the channel congestion value corresponding to the second carrier through measurement, or by receiving dedicated radio resource control (RRC) signaling or a system information block (SIB) message from a base station.

9. The method according to claim 1, wherein selecting, by the first terminal, the at least one direct link transmission carrier for the first data according to the at least one piece of first carrier information and according to the priority sequence based on the first channel congestion parameter information comprises:
when one or more carriers on which the first data is allowed to be transmitted does not comprise a currently selected transmission carrier, selecting, by the first terminal, the at least one direct link transmission carrier for the first data according to the at least one piece of first carrier information and according to the priority sequence based on the first channel congestion parameter information.

10. An apparatus, comprising:
a non-transitory memory, configured to store a program instruction; and
a processor, configured to invoke the program instruction stored in the memory, to perform the following operations:
obtaining first configuration information, wherein the first configuration information comprises at least one piece of first carrier information and first channel congestion parameter information corresponding to the at least one piece of first carrier information;
obtaining first data;
selecting at least one direct link transmission carrier for the first data according to the at least one piece of first carrier information and according to a priority sequence based on the first channel congestion parameter information; and
sending the first data on the at least one direct link transmission carrier.

11. The apparatus according to claim 10, wherein the processor is configured to obtain the first configuration information from a base station.

12. The apparatus according to claim 10, wherein the at least one piece of first carrier information represents at least one first carrier identifier.

13. The apparatus according to claim 10, wherein the first channel congestion parameter information represents channel congestion information of at least one first carrier corresponding to the at least one piece of first carrier information.

14. The apparatus according to claim 10, wherein the first configuration information is included in dedicated radio resource control (RRC) signaling or a system information block (SIB) message.

15. The apparatus according to claim 10, wherein:
the first channel congestion parameter information comprises a first channel congestion threshold; and
selecting the at least one direct link transmission carrier for the first data according to the at least one piece of first carrier information and according to the priority sequence based on the first channel congestion parameter information comprises:
selecting the at least one direct link transmission carrier for the first data from at least one second carrier in at least one first carrier corresponding to the at least one piece of first carrier information, wherein a channel congestion value corresponding to the at least one second carrier is less than or equal to the first channel congestion threshold.

16. The apparatus according to claim 15, wherein:
a carrier with a smaller channel congestion value has a higher priority in the priority sequence; and
selecting the at least one direct link transmission carrier for the first data comprises selecting at least one carrier with a minimum channel congestion value from the at least one second carrier as the at least one direct link transmission carrier.

17. The apparatus according to claim 15, wherein obtaining first configuration information comprises:
obtaining the channel congestion value corresponding to the at least one second carrier through measurement, or by receiving dedicated radio resource control (RRC) signaling or a system information block (SIB) message from a base station.

18. The apparatus according to claim 15, wherein selecting the at least one direct link transmission carrier for the first data comprises:
when one or more carriers on which the first data is allowed to be transmitted does not comprise a currently selected transmission carrier, selecting the at least one direct link transmission carrier for the first data according to the at least one piece of first carrier information and according to the priority sequence based on the first channel congestion parameter information.

19. A non-transitory computer readable storage medium, wherein the computer readable storage medium is configured to store one or more computer programs, and the one or more computer programs comprise an instruction for:
obtaining first configuration information, wherein the first configuration information comprises at least one piece of first carrier information and first channel congestion parameter information that corresponds to the at least one piece of first carrier information;
obtaining first data;
selecting at least one direct link transmission carrier for the first data according to the at least one piece of first carrier information and according to a priority sequence based on the first channel congestion parameter information; and
sending the first data on the at least one direct link transmission carrier.

20. The non-transitory computer readable storage medium according to claim 19, wherein obtaining the first configuration information comprises:
obtaining the first configuration information from a base station.

* * * * *